(12) United States Patent
Roach, Sr. et al.

(10) Patent No.: US 10,457,492 B2
(45) Date of Patent: Oct. 29, 2019

(54) TUBULAR MEZZANINE AND CONVEYOR SUPPORT STRUCTURES AND STIFFENER BRACKETS FOR ASSEMBLY THEREOF

(71) Applicant: ROACH MANUFACTURING CORPORATION, Trumann, AR (US)

(72) Inventors: Michael W. Roach, Sr., Trumann, AR (US); Christopher E. Kain, Tyronza, AR (US)

(73) Assignee: ROACH MANUFACTURING CORPORATION, Trumann, AZ (US)

( * ) Notice: Subject to any disclaimer, the term of this patent is extended or adjusted under 35 U.S.C. 154(b) by 0 days.

(21) Appl. No.: 16/357,096

(22) Filed: Mar. 18, 2019

(65) Prior Publication Data

US 2019/0210812 A1 Jul. 11, 2019

Related U.S. Application Data

(62) Division of application No. 15/400,252, filed on Jan. 6, 2017, now Pat. No. 10,239,702.

(51) Int. Cl.
*B65G 41/00* (2006.01)
*F16B 7/04* (2006.01)
*F16B 7/18* (2006.01)

(52) U.S. Cl.
CPC .......... *B65G 41/006* (2013.01); *F16B 7/0446* (2013.01); *F16B 7/185* (2013.01); *F16B 7/0493* (2013.01)

(58) Field of Classification Search
CPC ............................. B65G 41/006; F16B 7/0446
USPC ........................................... 198/860.1, 860.2
See application file for complete search history.

(56) References Cited

U.S. PATENT DOCUMENTS

| | | | | |
|---|---|---|---|---|
| 3,180,663 A | * | 4/1965 | Lehmann | F16B 7/0446 285/189 |
| 3,472,539 A | | 10/1969 | Fenwick | |
| 3,744,610 A | * | 7/1973 | Tabler | B65G 1/023 193/35 R |
| 3,748,814 A | * | 7/1973 | Cribben | E06B 3/685 52/668 |
| 3,877,579 A | | 4/1975 | Weider | |
| 4,172,677 A | | 10/1979 | Gunti | |
| 4,596,104 A | * | 6/1986 | Yamazaki | E04B 1/5831 403/346 |
| 4,683,634 A | | 8/1987 | Cole | |

(Continued)

OTHER PUBLICATIONS

Kan. Interlocking joints are unique in comparison to CMM Laser located in Italy. Oct. 21, 2016.

(Continued)

*Primary Examiner* — Joseph A Dillon, Jr.
(74) *Attorney, Agent, or Firm* — Jacobson Holman, PLLC

(57) ABSTRACT

An interlocking system of tubular members is provided for support of conveyors and mezzanines, each tubular member having cutouts and slots for assembly with other of the tubular members to form elbow joints, tee joints and cross joints, and stiffener brackets to reinforce the interlocking joints to form a strong support structure without the need for welding. A mezzanine conveyor assembly is also provided that includes a support structure constructed of non-welded interlocking tubular members reinforced with stiffener brackets, with a mezzanine/platform and at least one conveyor supported on the support structure.

24 Claims, 18 Drawing Sheets

(56) References Cited

U.S. PATENT DOCUMENTS

| | | |
|---|---|---|
| 5,421,451 A | 6/1995 | Easton |
| 6,170,649 B1 | 1/2001 | Radandt |
| 7,090,427 B2 | 8/2006 | Petratto |
| 8,074,787 B2 | 12/2011 | Grilli |
| 8,408,386 B1 | 4/2013 | Rauser |
| 2002/0060145 A1 | 5/2002 | Doerfer |
| 2012/0090140 A1 | 4/2012 | Montemayor |
| 2015/0210478 A1 | 7/2015 | Batchelder |
| 2015/0259148 A1 | 9/2015 | Hall |
| 2016/0002910 A1 | 1/2016 | Green |
| 2016/0123364 A1 | 5/2016 | Hooper |
| 2016/0207579 A1 | 7/2016 | Hosker |

OTHER PUBLICATIONS

12K Primary Sort Slide Delivery Station Details; PS-STD-DS-12K REV 008.DWG; Sheets 1-310/21/2016.
12K Primary Sort Delivery Station—Section Details; PS-STD-DS-12K REV608 DWG; Sheet 4-6.
12K Primary Sort Slide Delivery Station—Section Details; PS-STD-DS-12K REV 008.DWG; Sheets 7-9.

* cited by examiner

TUBULAR MEZZANINE AND CONVEYOR SUPPORT STRUCTURES AND STIFFENER BRACKETS FOR ASSEMBLY THEREOF

This application is a continuation application of U.S. Ser. No. 15/400,252, filed Jan. 6, 2017, and issuing as U.S. Pat. No. 10,239,702 on Mar. 26, 2019, and hereby claims the priority thereof to which it is entitled.

BACKGROUND OF THE INVENTION

Field of the Invention

The present invention is related to the field of support structures for conveyors and mezzanines and, more particularly, to an interlocking system of tubular members and joint stiffening brackets for mezzanine and conveyor supports that is assembled without the need for welding, and a mezzanine and conveyor assembly with such a support structure.

Description of the Related Art

Mezzanines often have associated conveyors, such as mezzanine floor incline conveyors, to move products between floors in a building. Conveyors assembled with mezzanines provide faster transport of goods and/or equipment between floors and are simpler to operate and usually less expensive than a goods lift or elevator, making mezzanine conveyor assemblies a good alternative to these more permanent constructions. Mezzanine and conveyor support structures are currently constructed by welding a plurality of members to one another at their points of intersection. In orienting the support members prior to welding it can be difficult to ensure that the support members are properly positioned with good joint angles, generally in perpendicular relationship, between the support members. Further, welding is expensive, requiring skilled laborers to ensure the welds are done properly. Finally, once the welded joints are completed, the finished joints are essentially permanent such that the resulting support structure is not easily modified or disassembled.

Accordingly, a need exists for a mezzanine and conveyor support structure that can be assembled in less time and with greater accuracy and that, once assembled, can be modified more easily than a comparable structure constructed with welded joints without compromising strength. A need also exists for a conveyor and mezzanine assembly that can be installed in high ceilinged spaces such as warehouses to efficiently move products between floors while having a support structure constructed with joints that can be disassembled, enabling the assembly to be more readily dismantled and relocated.

SUMMARY OF THE INVENTION

In view of the foregoing, the present invention is directed to an interlocking system of tubular members for supporting conveyors and mezzanines. Each tubular member has cutouts and slots formed therein that are configured to interlock with the complementary cutouts and slots in an adjoining tubular member to form an interlocking joint between the members in which the opposed surfaces of the members are flush at the joint while also ensuring that the tubular members are in proper positional relationship with one another. The interlocking joints according to the present invention include elbow joints, tee joints and cross joints.

The system of the present invention further includes stiffener brackets that are placed on the opposite side walls of the joint and secured to one another and to the joint by fastening members such as bolts or the like. The stiffener brackets securely clamp the tubular members in place and reinforce the rigidity of the joint that was compromised by the cutouts and slots made in the tubular members in order to form the interlocking joint with continuous flush side walls. The interlocking joints as reinforced with the stiffening brackets form a strong support structure for conveyors and mezzanines and, since the members are bolted rather than welded together, the configuration of the structure can be more easily modified than a conventional welded support structure.

Accordingly, it is an object of the present invention to provide a support structure for conveyors and mezzanines that includes a plurality of tubular members having respective cutouts and slots through which two tubular members are nested together and interlocked to one another at a joint, with the joint being reinforced by stiffener brackets that replace the material removed to form the cutouts, the brackets increasing the rigidity of the structure and clamping the tubular members against one another.

Another object of the present invention is to provide a support structure for conveyors and mezzanines in accordance with the preceding object in which the tubular members may be arranged to form elbow joints, tee joints and cross joints, the cutouts and slots in the tee and elbow joints being formed between first and second tubular members that are configured such that an open end of one or more of the tubular members is closed by one of the sides of the other tubular member when the two tubular members are interlocked, eliminating the need for a plug.

A further object of the present invention is to provide a support structure for conveyors and mezzanines in accordance with the preceding objects in which a cutout and a slot is formed in the inner side of each of the first and second tubular members, the cutouts and slots being aligned to bring the first and second tubular members into nested engagement with one another when the first and second tubular members are joined along their slots, the inner side of the first tubular member being flush with the outer side of the second tubular member when the two members are interlocked to form a continuous flat surface against which the brackets are placed in abutment.

Yet another object of the present invention is to provide a support structure for conveyors and mezzanines in accordance with the preceding objects in which each joint between first and second tubular members is sandwiched on either side between two stiffener brackets, the brackets and the tubular members having apertures therethrough that receive fastening elements to clamp the tubular members and brackets together.

Still another object of the present invention is to provide a support structure for conveyors and mezzanines in accordance with the preceding objects in which each bracket has at least two arms, each of which is in abutment with a different one of two interlocked tubular members.

A further object of the present invention is to provide a support structure for conveyors and mezzanines in accordance with the preceding objects in which each bracket includes planar arms in abutment and coplanar with an outer side of a respective tubular member and an inner side of a second tubular member, the planar arms being provided with flanges that are generally perpendicular to said planar arms to be generally parallel with and adjacent the adjoining sides of the tubular members.

Still a further object of the present invention is to provide a support structure for conveyors and mezzanines in accordance with the preceding objects in which the flanges of one of the two interlocked tubular members extend to be generally parallel with and adjacent the adjoining sides of a first one of the interlocked tubular members while the flanges on the other of the two arms extend to be generally parallel with and adjacent the adjoining sides of the second one of the interlocked tubular members so that the bracket and its flanges effectively create a reinforcing connection between the first and second tubular members that supplements the primary connection formed by the nested interlocked relationship.

A yet further object of the present invention is to provide a support structure for conveyors and mezzanines in accordance with the preceding objects in which the joints between the tubular members may be disassembled by removal of the fastening elements and slidable disengagement of the nested arrangement of the tubular members.

Still another object of the present invention is to provide a mezzanine conveyor assembly including a support structure in accordance with the preceding objects in which a mezzanine/platform is supported on the support structure at a distance above the floor or other support surface and/or at least one conveyor is supported on the support structure.

Yet another object of the present invention is to provide a mezzanine conveyor assembly in accordance with the preceding object in which a mezzanine/platform and a conveyor are supported on the support structure, the conveyor being inclined to extend from an upper end on or adjacent the mezzanine/platform to a lower end on or adjacent the floor or comparable support surface.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1F-1 is a top view of the tubular member shown in FIG. 1F.

FIG. 1F-2 is a side view of the tubular member shown in FIG. 1F.

FIG. 1F-3 is a bottom view of the tubular member shown in FIG. 1F.

FIG. 1G-1 is a top view of the tubular member shown in FIG. 1G.

FIG. 1G-2 is a side view of the tubular member shown in FIG. 1G.

FIG. 1G-3 is a bottom view of the tubular member shown in FIG. 1G.

FIG. 2 is an exploded perspective view of the components of an elbow joint between two tubular members in accordance with the present invention.

FIG. 2AA is an enlarged view of Detail B of FIG. 2A.

FIG. 2BB is an enlarged view of Detail C of FIG. 2B.

FIG. 3 is an exploded perspective view of the components of a tee joint between two tubular members in accordance with the present invention.

FIG. 3AA is an enlarged view of Detail B of FIG. 3A.

FIG. 3BB is an enlarged view of Detail C of FIG. 3B.

FIG. 4AA is an enlarged view of Detail B of FIG. 4A.

FIG. 4BB is an enlarged view of Detail C of FIG. 4B.

DETAILED DESCRIPTION OF THE PREFERRED EMBODIMENTS

Figure 1:
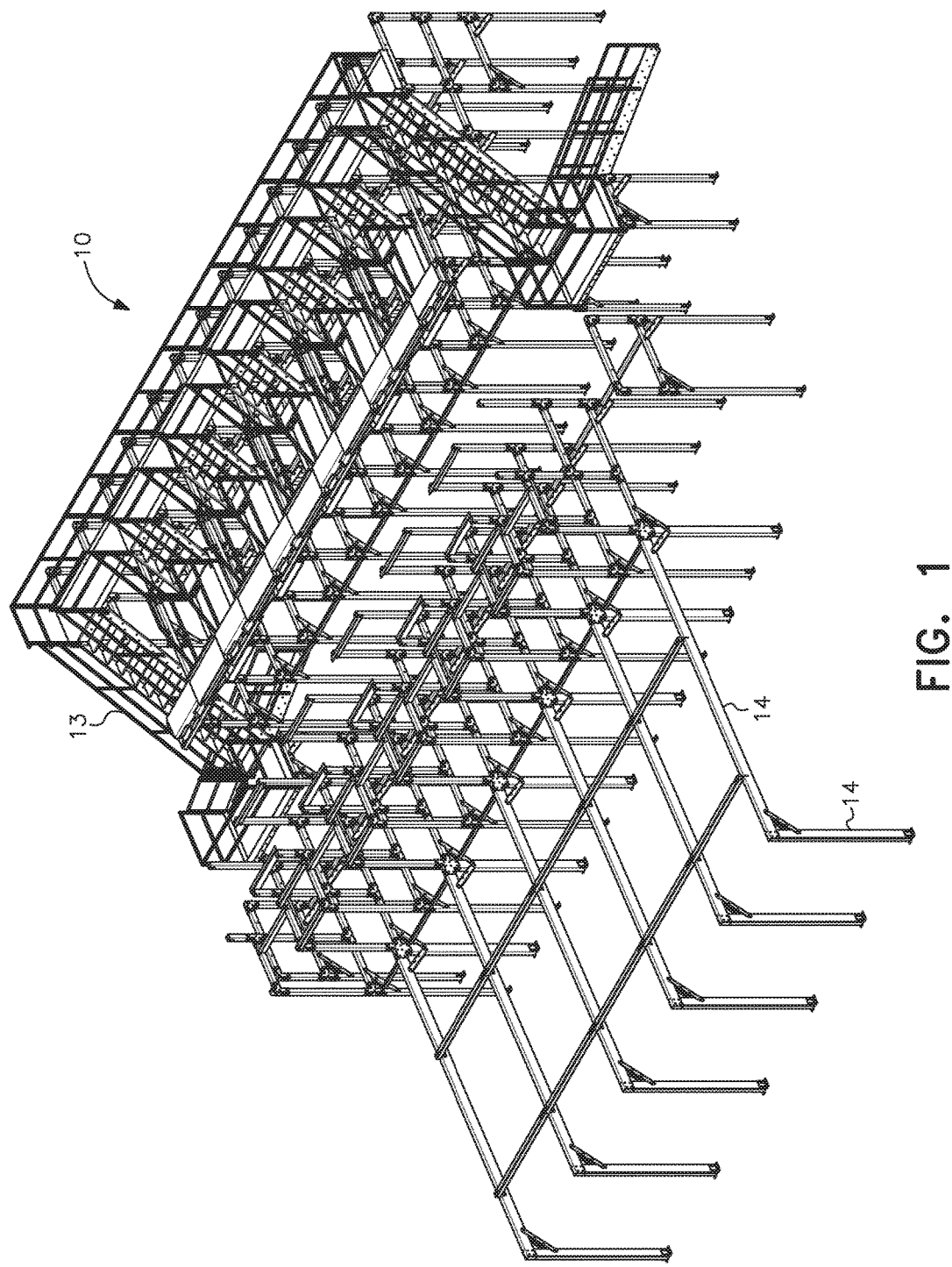
FIG. 1 is a perspective view of a conveyor and mezzanine support structure in accordance with the present invention showing a supported mezzanine/platform.

In explaining in detail the preferred embodiments for joints used in the support structure of the invention, it is to be understood that the embodiments are given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 1A:
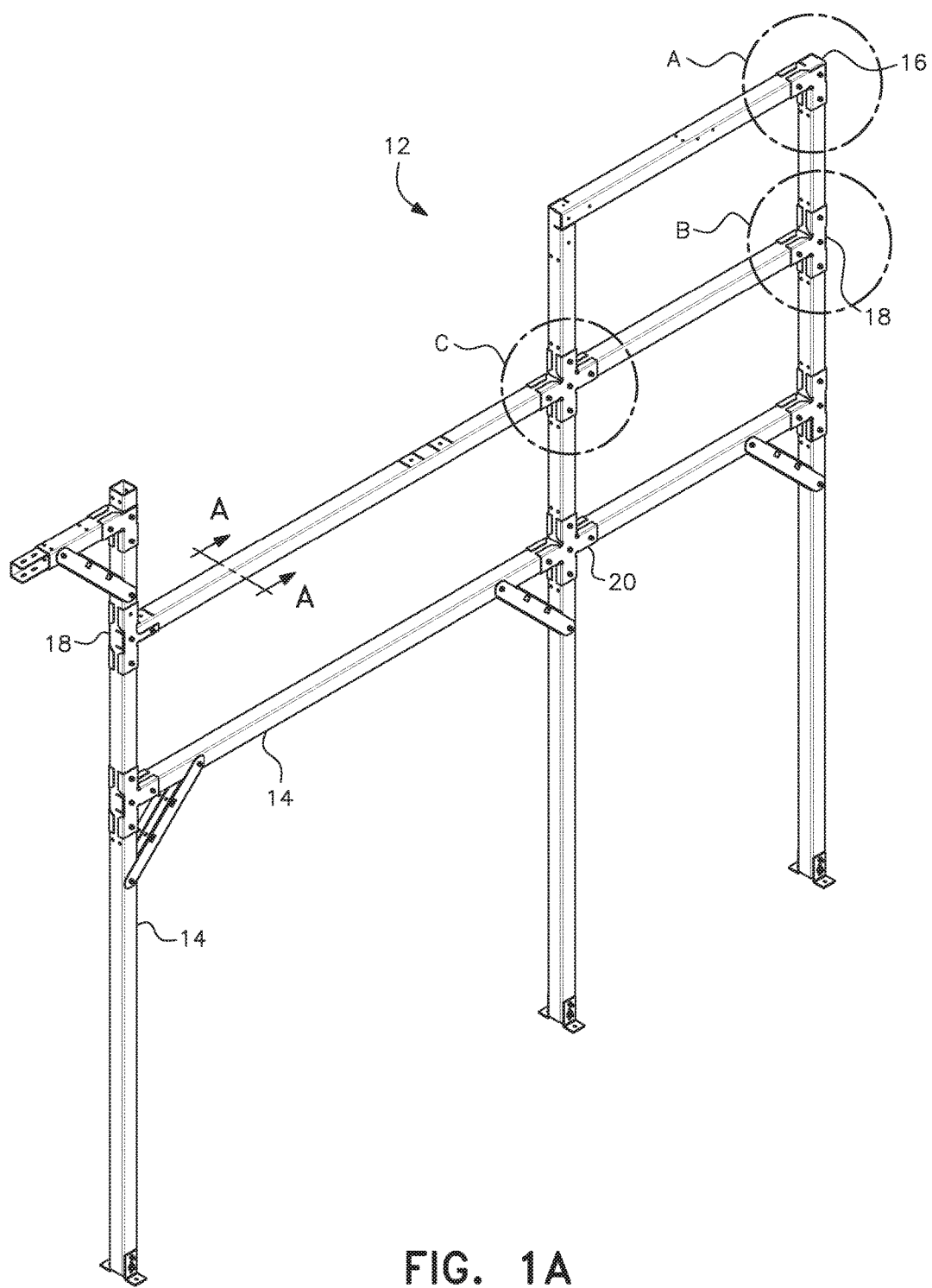
FIG. 1A is a perspective view of a subassembly of the support structure shown in FIG. 1.

As shown in FIG. 1, the present invention is directed to a support structure for conveyors and mezzanines, generally designated by reference numeral 10. The support structure is comprised of a plurality of subassemblies like that shown in FIG. 1A and generally designated by reference numeral 12. A mezzanine 13 is shown being supported at the upper back portion of the support structure 10.

Figure 1B:
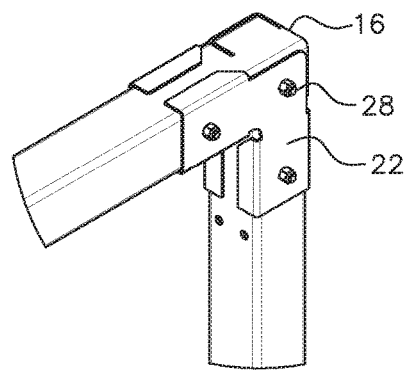
FIG. 1B is an enlarged view of Detail A (an elbow joint) of FIG. 1A.
Figure 1C:
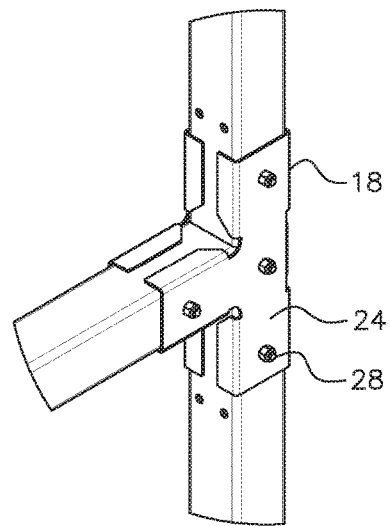
FIG. 1C is an enlarged view of Detail B (a tee joint) of FIG. 1A.
Figure 1D:
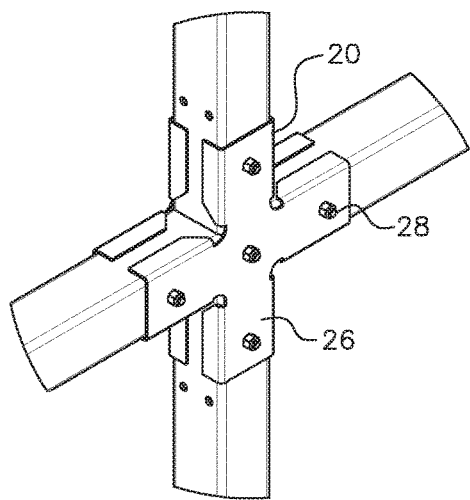
FIG. 1D is an enlarged view of Detail C (a cross joint) of FIG. 1A.

Each subassembly 12 includes a plurality of elongated tubular members 14 that are joined to one another at points of intersection to form elbow joints 16, tee joints 18 and cross joints 20 as shown individually in the enlarged views of FIGS. 1B, 1C and 1D, respectively. The elbow joint is reinforced with a matched pair of opposed elbow joint brackets 22, the tee joint is reinforced with a matched pair of opposed tee joint brackets 24, and the cross joint is reinforced with a matched pair of opposed cross joint brackets 26. The brackets 22, 24, 26 are secured to one another and to the tubular members 14 at each joint by fastening elements 28. As is evident from FIG. 1, there are a plurality of subassemblies 12 and a plurality of elbow joints 16, tee joints 18 and cross joints 20 in a conveyor and mezzanine support structure 10 of the type to which the present invention is directed.

Figure 1E:
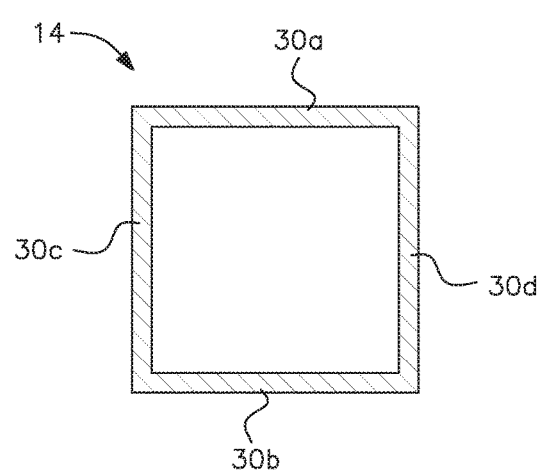
FIG. 1E is a cutaway view taken along line A-A of FIG. 1A.

In the embodiment shown, each tubular member 14 has four sides generally designated by reference numeral 30 and a substantially square lateral cross section as shown in FIG. 1E. The four sides 30 include an inner side 30a and an outer side 30b joined by two adjoining sides 30c, 30d. As used herein, the "inner" side refers to that side of each tubular member that faces another tubular member when a joint is to be made between them. The "outer" side refers to that side of each tubular member which is opposite its inner side. The "adjoining" sides are the remaining two sides that extend between the inner and outer sides. As would be evident to the skilled person, the designations of "inner", "outer" and "adjoining" are meant to facilitate explanation but do not connote any fundamental difference as all four sides are substantially the same as starting components. However, once the tubular members are machined for use, the inner, outer and adjoining sides are structurally distinct as will be described hereinafter.

In addition, while tubular members having a square lateral cross section are shown, the cross section may be rectangular as the sides of the tubular members do not have to be equal. Therefore, while the square cross sectional tubular members will be described herein, this description is provided with the understanding that the tubular members may have other cross sectional configurations and the present invention is not limited to tubular members having a square lateral cross section.

Figure 1F:
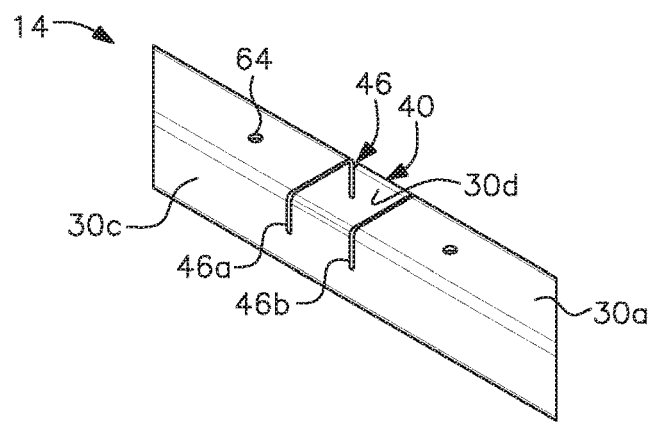
FIG. 1F is a partial perspective view of a tubular member showing the cutout in a midway portion thereof.
Figures 1, 1F:
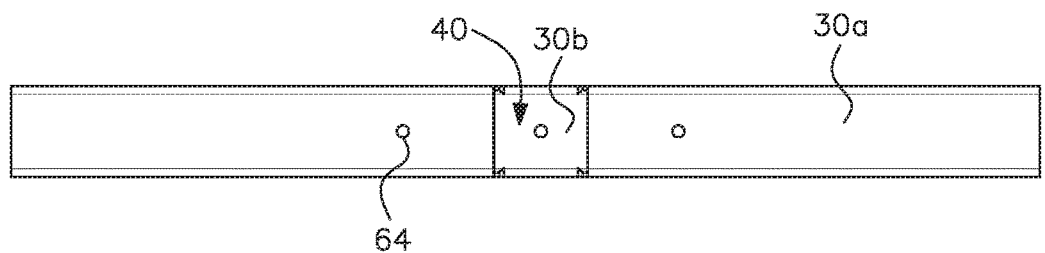
Figures 1, 1F, 2:
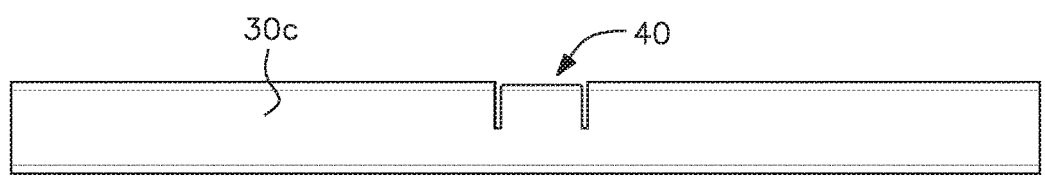
Figure 4:
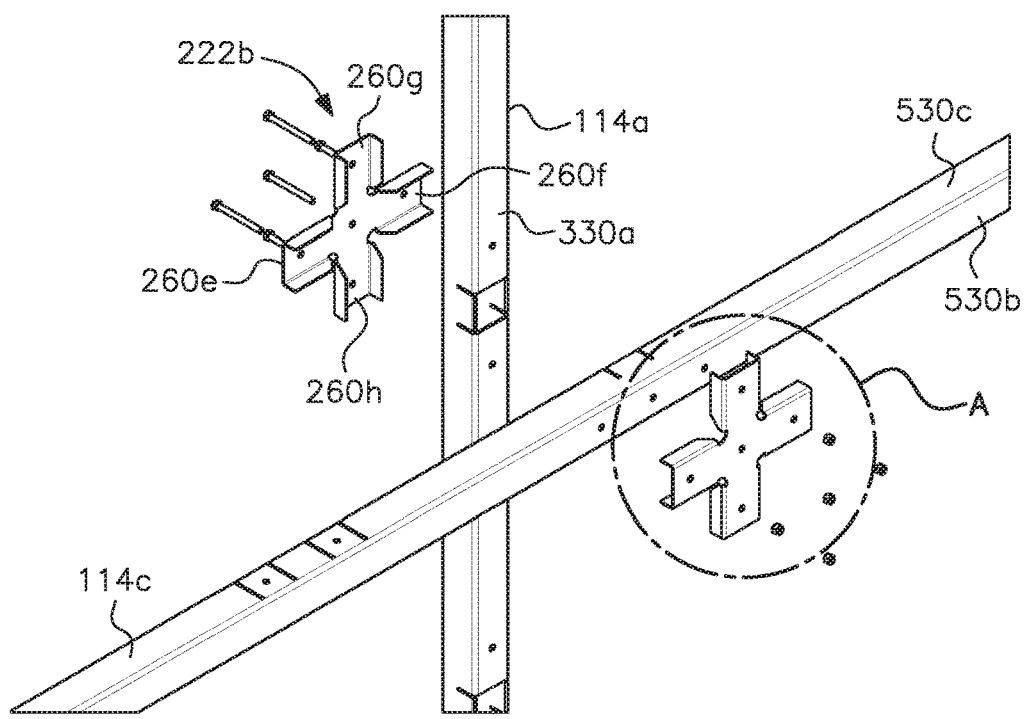
FIG. 4 is an exploded perspective view of the components of a cross joint between two tubular members in accordance with the present invention.
Figure 4A:
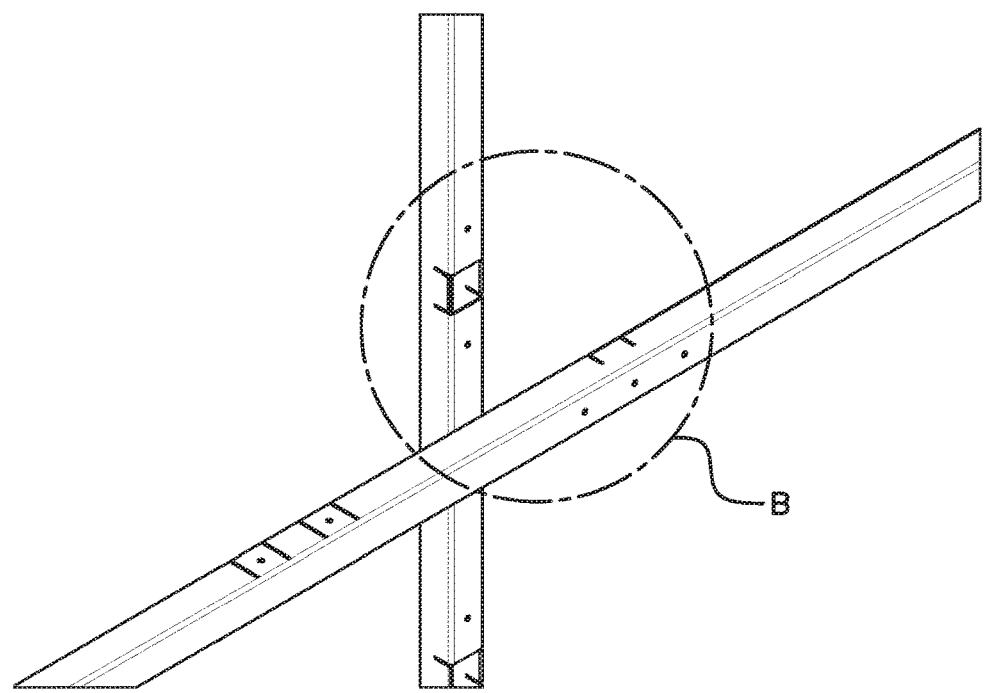
FIG. 4A shows just the two tubular members of FIG. 4.
Figure 4B:
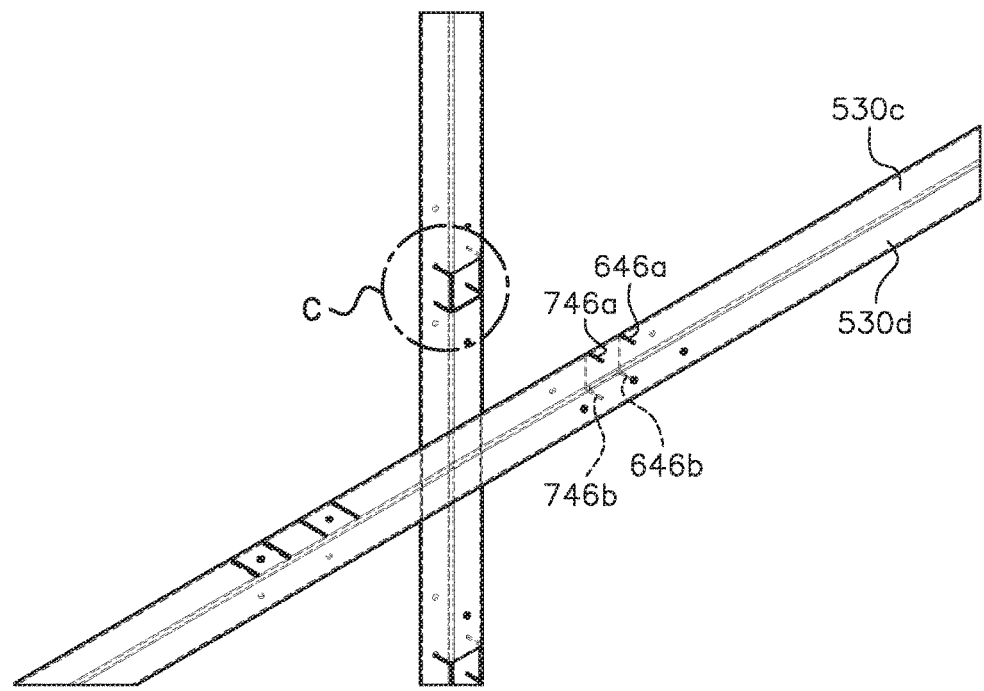
FIG. 4B is another view of the two tubular members shown in FIG. 4A.

During manufacture, material is removed from the inner side 30a and the two adjoining sides 30c, 30d of each tubular member 14 to define a cutout generally designated by reference numeral 40 as shown in the perspective view of FIG. 1F and the top and side views provided in FIGS. 1F-1 and 1F-2, respectively (see also FIGS. 4BB, 4E and 4F). In this regard, FIG. 1F is a representation of a first type of cutout 40, namely a mid-point cutout, for the purposes of general description with the understanding that the specific configuration of the cutout 40 will vary according to the type of joint being formed as will be further described hereinafter.

Figures 1, 1F, 2, 3:
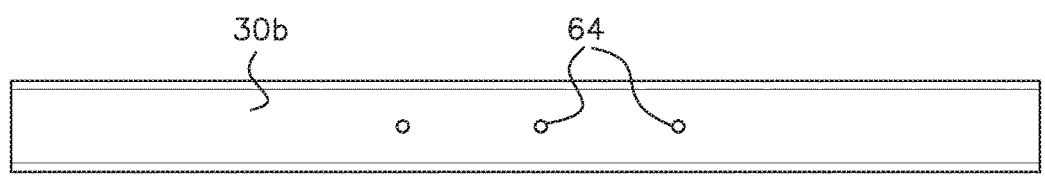
Figure 1G:
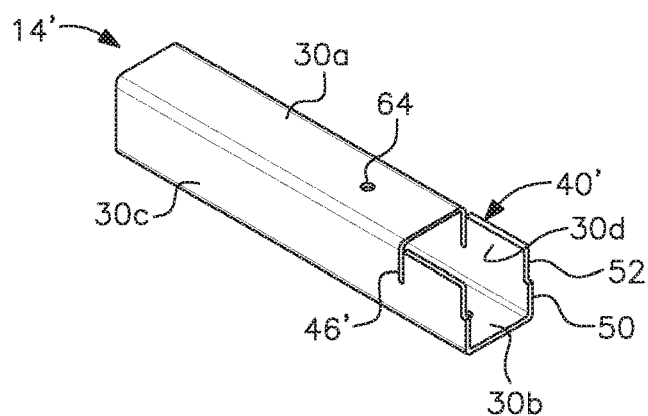
FIG. 1G is a partial perspective view of a tubular member showing the cutout in an end thereof.
Figures 1, 1G:
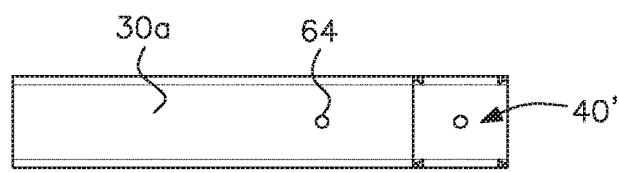
Figures 1, 1G, 2:
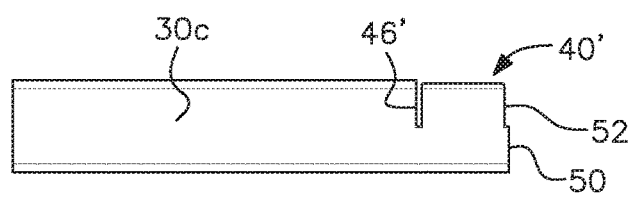
Figures 1, 1G, 2, 3:
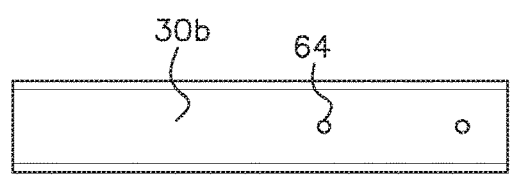
Figure 3:
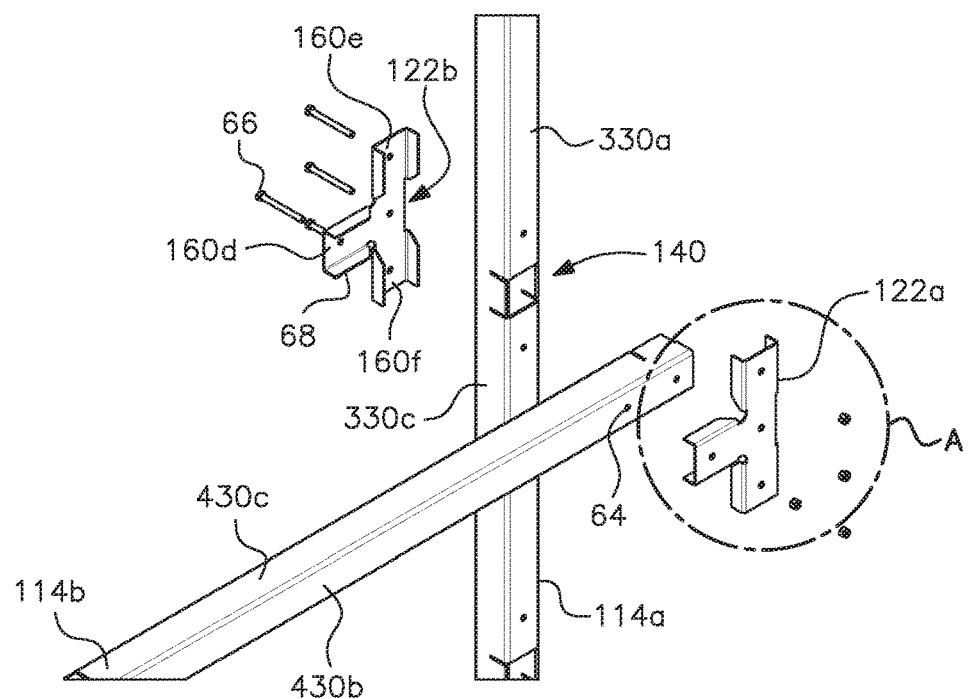
Figure 3A:
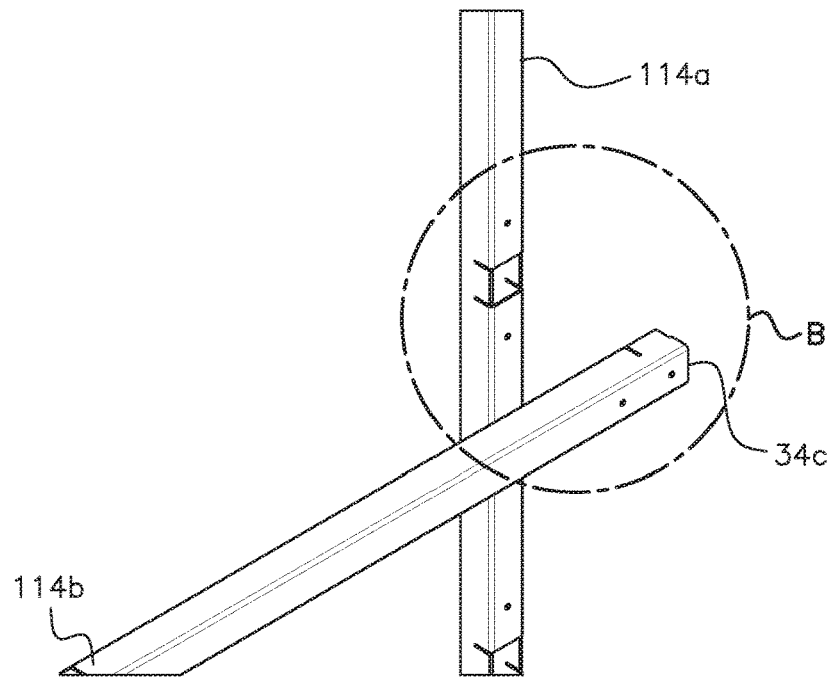
FIG. 3A shows just the two tubular members of FIG. 3.
Figure 3B:
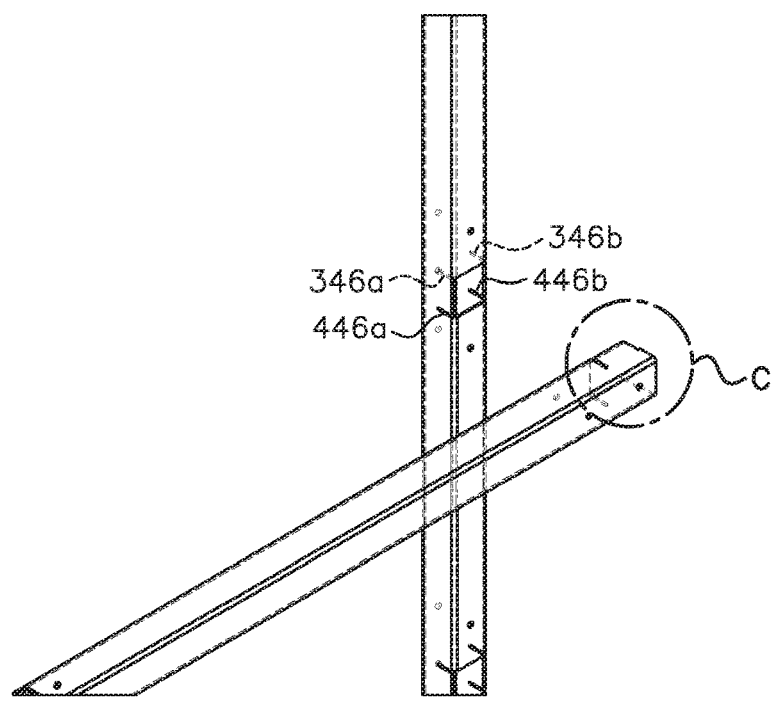
FIG. 3B is another view of the two tubular members shown in FIG. 3A.
Figure 3C:
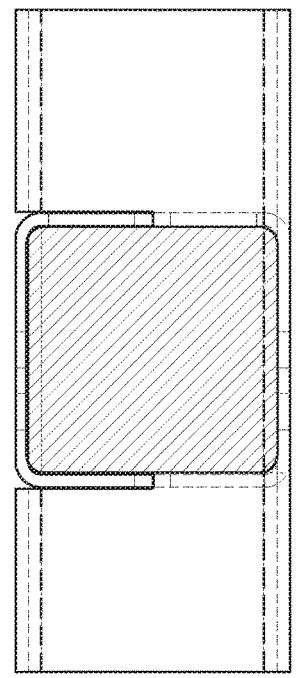
FIG. 3C is a view taken from the end of the horizontal tubular member when interlocked to form the tee joint, with the hatched portion illustrating how the side wall of the vertical tubular member covers up the open end of the horizontal tubular member to eliminate the need for a plug.

FIG. 1G shows a second type of cutout, generally designated by reference numeral 40', made in the end portion of a tubular member, with FIGS. 1G-1, 1G-2 and 1G-3 showing top, side and bottom views of the elongated member 14' shown in FIG. 1G, respectively (see also FIGS. 3BB, 3E and 3F).

With reference to FIG. 1F, the cutout 40 includes a substantially rectangular central cutout 44, rectangular and preferably square as shown, in the inner side 30a and at least one linear slot, generally designated by reference numeral 46, cut into each adjoining side 30c, 30d, respectively. As shown in FIG. 1F, the cutout 40 may include two linear slots 46a, 46b longitudinally spaced from one another. With respect to a vertical tubular member that is part of a cross joint, FIG. 4E shows the material that is removed to form similar linear slots 346a and 446a, and FIG. 4F shows the material that is removed to form a comparable central cutout 244a.

In the end portion cutout 40' shown in FIG. 1G, the cutout includes one linear slot 46' in each of the adjoining sides 30c, 30d and a stepped cut 52 in the end edge 50 of the two adjoining sides 30c, 30d. With respect to a horizontal tubular member that is part of a tee joint, FIG. 3E shows the material that is removed to form a similar linear slot 546a and a similar stepped cut 52e, and FIG. 3F shows the material that is removed to form a comparable central cutout 144c.

As used herein, unless otherwise specified the term "longitudinal" refers to the lengthwise extension of the tubular members while the term "lateral" refers that direction perpendicular to the longitudinal direction. Also, for clarity, reference numerals used to refer to structural features that are common to more than one joint will be differentiated by adding a prefix numeral such as "1", "2", etc., for each specific joint configuration. Suffixes such as "a", "b", etc., are added to reference numerals to differentiate between structural elements that are essentially the same from one joint to another, differing only in orientation or relationship in each particular type of joint.

An exploded view of a complete elbow joint 16 is shown in FIG. 2. The elbow joint 16 is formed between an end 34a of an upright or vertically oriented tubular member 14a and an end 34b of a horizontally oriented tubular member 14b. Material removed from the inner side 130a and two adjoining sides 130c, 130d at the end 34a of the vertical tubular member 14a defines a cutout generally designated by reference numeral 40a. In a similar manner, material removed from the inner side 230a and two adjoining sides 230c, 230d at the end 34b of the horizontal tubular member 14b defines a cutout generally designated by reference numeral 40b.

Figure 2:
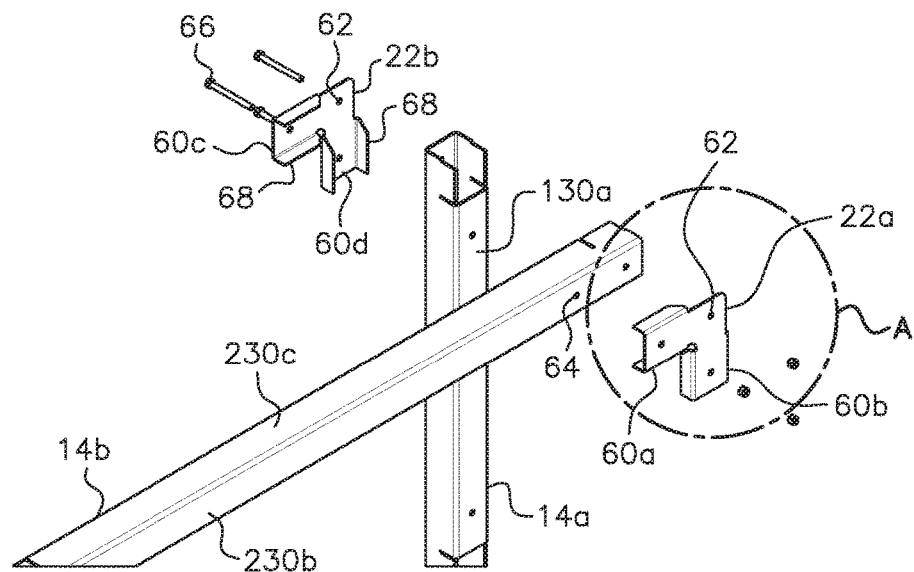
Figure 2A:
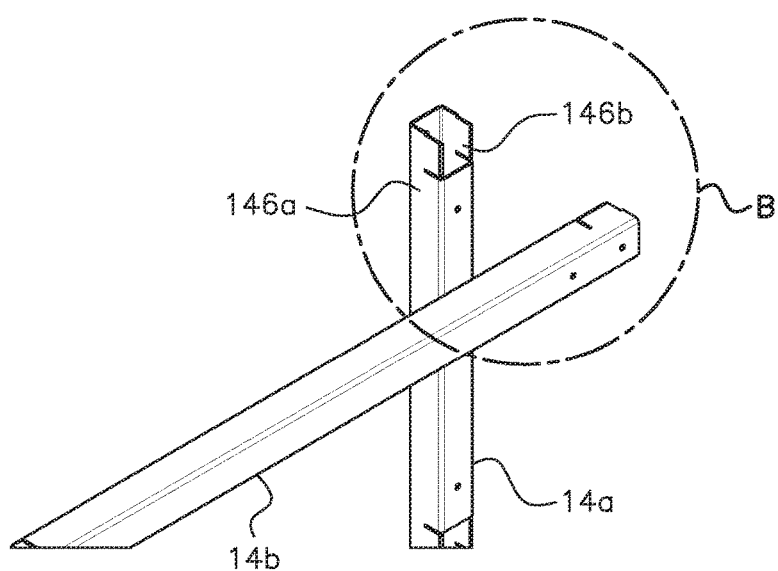
FIG. 2A shows just the two tubular members of FIG. 2.

The cutout 40a in the vertical tubular member 14a includes a substantially rectangular central cutout 144a, preferably square as shown, in the inner side 130a (see FIG. 2AA). A first linear slot 146a is cut into adjoining side 130c and a second linear slot 146b is cut into adjoining side 130d. The linear slots 146a, 146b are in horizontal alignment with one another and extend laterally from the central cutout 144a with a depth of the slots 146a, 146b being approximately one-half the outside dimension of the adjoining sides 130c, 130d within which they are formed. The width of the slots 146a, 146b is approximately equal to the thickness of the adjoining sides 230c, 230d of the horizontal tubular member 14b, to allow the horizontal tubular member to be nested within the cutout 40a of the vertical tubular member 14a when the elbow joint is formed and create a continuous flat surface between the inner side 130a of the vertical member 14a and the outer side 230b of the horizontal member 14b that is flush therewith.

The cutout 40a at the end 34a of the vertical tubular member 14a further includes a stepped cut in the end edge 50a of each of the adjoining sides 130c, 130d to form stepped cuts 52a and 52b (see FIG. 2AA). The stepped cuts 52a, 52b are parallel with, and have the same depth as, the slots 146a, 146b, respectively. The width of the stepped cuts 52a, 52b as measured in the longitudinal direction of the tubular member 14a, is about the same as the thickness of the adjoining edge 230c of the horizontal tubular member 14b adjacent the cutout 40b.

Figure 2B:
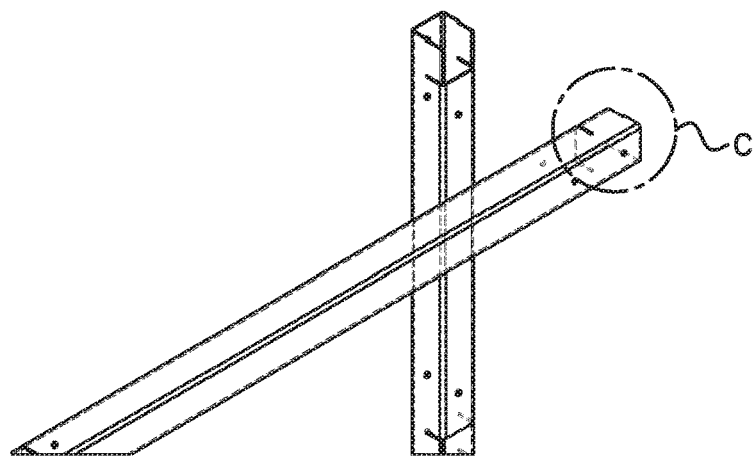
FIG. 2B is another view of the two tubular members shown in FIG. 2A.

The cutout 40b at the end 34b of the horizontal tubular member 14b also includes a substantially rectangular central cutout 144b in the inner side 230a and a linear slot 246a, 246b cut into each adjoining side 230c, 230d, respectively (see FIG. 2BB). The linear slots 246a, 246b extend laterally from the central cutout 144b with a depth of the slots 246a, 246b being approximately one-half the outside dimension of the adjoining sides 230c, 230d. The slots 246a, 246b in each adjoining side 230c, 230d are parallel and vertically aligned with one another, and are spaced from the outer end edge 50b of the horizontal tubular member 14b by a distance slightly greater than the spacing between the adjoining sides 130c, 130d of the vertical tubular member 14a.

As with the vertical tubular member, the cutout 40b at the end 34b of the horizontal tubular member 14b includes stepped cuts 52c, 52d in the end edge 50b of each of the adjoining sides 230c, 230d, respectively. The stepped cuts 52c, 52d are parallel with, and have the same depth as, the slots 246a, 246b, respectively. The width of the stepped cuts 52c, 52d as measured in the longitudinal direction of the tubular member 14b, is about the same as the thickness of the adjoining edge 130d of the vertical tubular member 14a adjacent the cutout 40a.

Figure 2C:
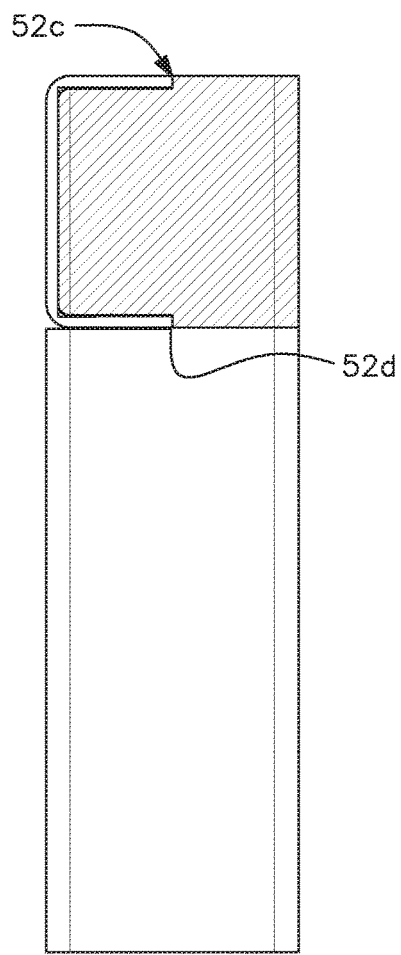
FIG. 2C is a view taken from the end of one of the tubular members when interlocked to form the elbow joint, with the hatched portion illustrating how the side wall of one tubular member covers up the open end of the other tubular member to eliminate the need for a plug.

To form a joint between the vertical tubular member 14a and the horizontal tubular member 14b, the cutouts 40a, 40b are brought into alignment and abutment with one another so that the slot 246b in the horizontal tubular member 14b is nested in the slot 146a formed in the adjoining side 130c of the vertical tubular member. At the same time, the stepped cuts 52a, 52b in the end edge 50a of the vertical tubular member 14a are brought into engagement with the slot 246a and the stepped cut 52c in the horizontal tubular member 14b, respectively. Similarly, the stepped cut 52d in the end edge 50b of the horizontal tubular member 14b is brought into engagement with the slot 146b in the adjoining side 130d of the vertical tubular member 14a. As shown in FIG. 2C, the stepped cuts 52c, 52d provide room for the adjoining side 130d to fit over and close the open end 34b of the horizontal tubular member 14b, eliminating any need for a plug when the horizontal and vertical tubular members are interlocked. In addition, the engagement between the stepped cuts and the slots results in a continuous flat surface between the adjacent sides of the vertical and horizontal members when fully interlocked, with the inner side 130a of the vertical member 14a being flush with the outer side 230b of the horizontal member 14b as shown in FIG. 2E. At the same time, the outer side 130b of the vertical member 14a is flush with the inner side 230a of the horizontal member 14b.

To overcome the weakness caused by removal of material in order to make the cutouts and to reinforce the rigidity and structural strength of the joint, matching stiffener brackets 22a, 22b are placed on opposite side walls of the joint and bolted to one another. The stiffener brackets reinforce and clamp the tubular members together (see FIGS. 2, 2D and 2E).

Bracket 22a includes a planar body having two arms 60a, 60b of substantially equal length, forming a truncated L shape. Bracket 22b is the mirror image of bracket 22a and has the same construction with a planar body having two arms 60c, 60d. While the two arms 60a and 60b of the first bracket and the two arms 60c and 60d of the second bracket are shown and described as being of equal length, this is not necessary as the arms may be of different lengths. For example, arms 60a and 60c are preferably the same length in order to match up on either side of the joint but may be longer than arms 60b and 60d, or vice versa. Whatever the relative lengths of the two arms of bracket 22a, the corresponding bracket 22b should be a mirror image for fastening of the bracket pair on either side of the joint as will be described further hereinafter.

When the horizontal and vertical tubular members are interlocked, the first arm 60a of bracket 22a is in abutment with the outer side 230b of the horizontal tubular member 14b and the second arm 60b is in abutment with the inner side 130a of the vertical tubular member 14a. Likewise, the first arm 60c of bracket 22b is in abutment with the inner side 230a of the horizontal tubular member 14b and the second arm 60d is in abutment with the outer side 130b of the vertical tubular member 14a. The brackets 22a, 22b have apertures 62 therein that align with corresponding apertures 64 in the tubular members to allow fastening members such as bolts 66 to be inserted through the completed joint and tightened with nuts 67 to securely clamp the tubular members against one another. In this regard, while it would be possible for bracket arm 60a of bracket 22a to be longer than bracket arm 60c of bracket 22b, provided the two bracket arms 60a and 60c nonetheless have aligned apertures 62, it is preferred that the brackets be mirror images of one another.

Figure 2D:
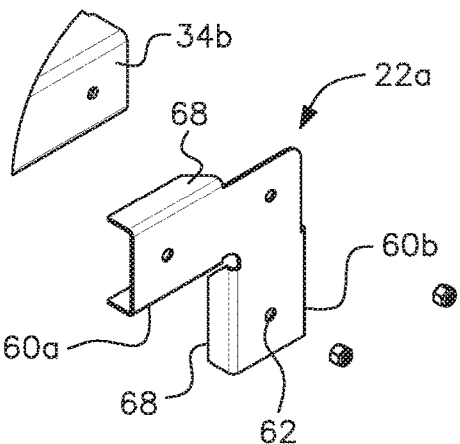
FIG. 2D is an enlarged view of Detail A of FIG. 2.
Figure 2E:
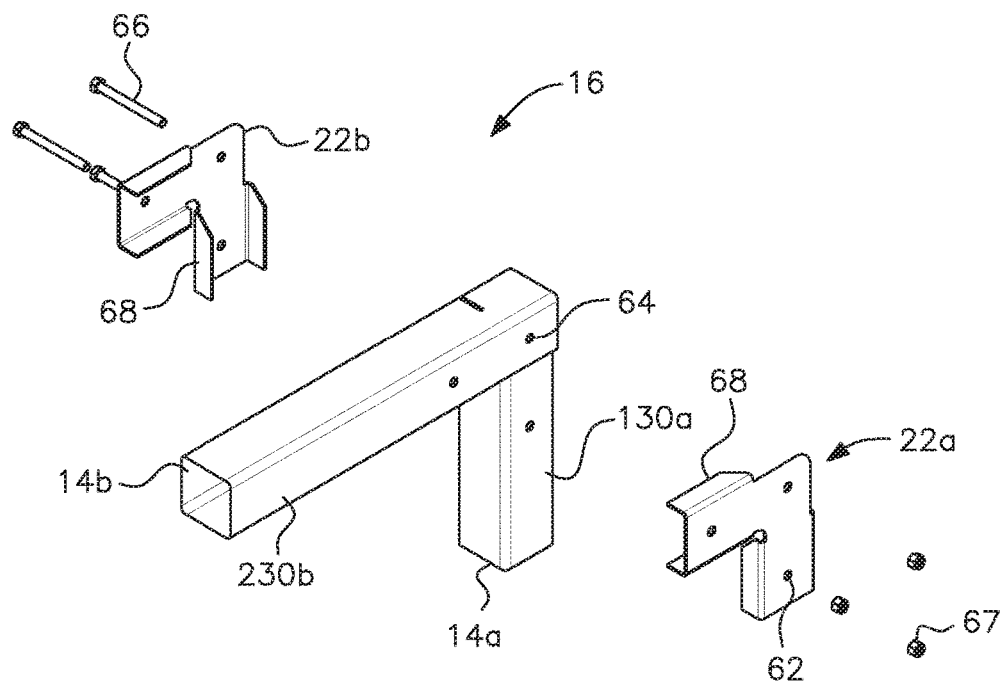
FIG. 2E is an exploded view of the brackets and an elbow joint formed by interlocking the end portions of two tubular members with the sides thereof flush with one another.
Figure 2A:
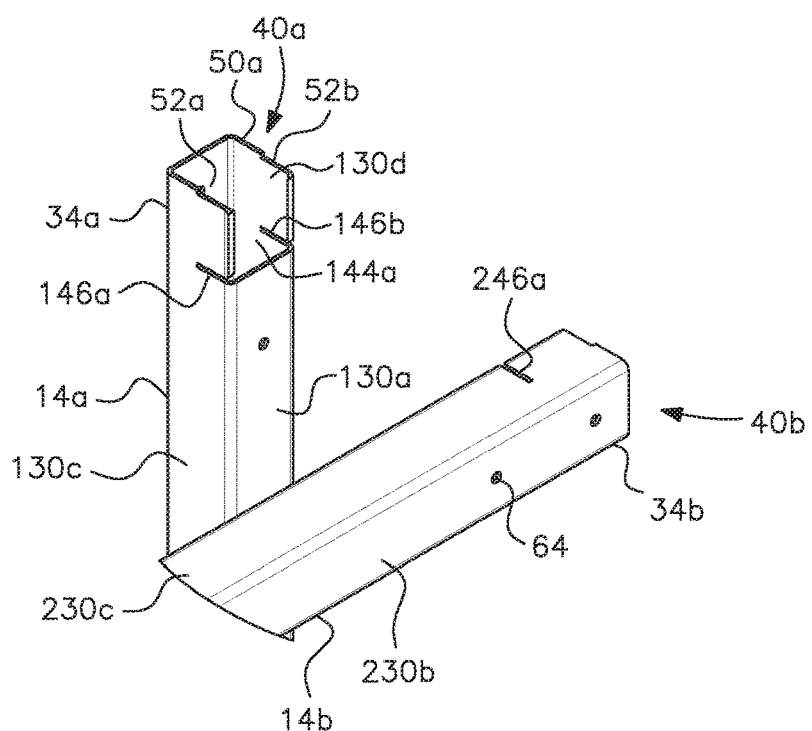
Figure 2B:
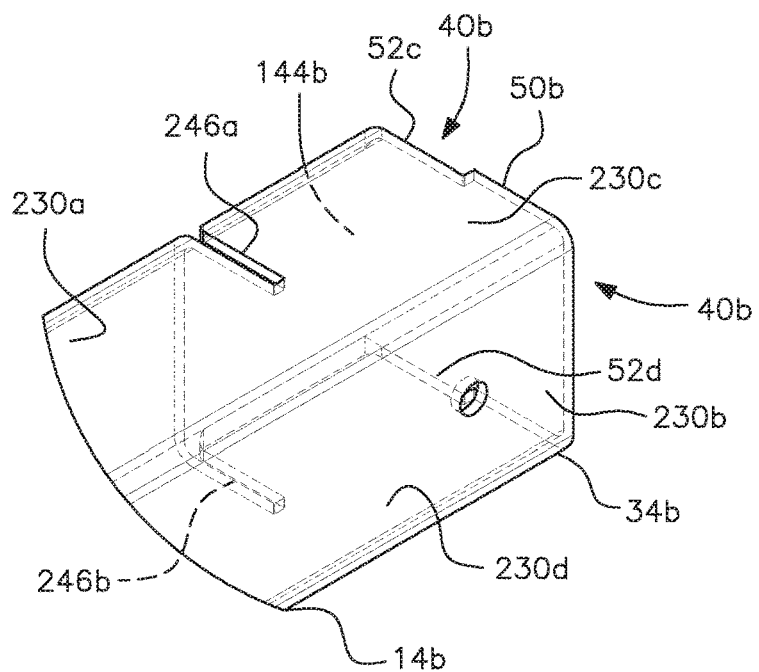

As shown in FIGS. 2, 2D and 2E, the brackets are preferably provided with flanges 68 that extend outwardly from and perpendicular to the arms. The flanges 68 provide additional stability to the joint by effectively locking each arm around a respective one of the tubular members. More particularly, when the vertical and horizontal tubular members are interlocked, the pair of flanges 68 on arm 60a of bracket 22a extend to be generally parallel with and adjacent the adjoining sides 230c, 230d of the horizontal tubular member 14b while the flanges 68 on arm 60b extend to be generally parallel with and adjacent the adjoining sides 130c, 130d of the vertical tubular member 14a. Similarly, the pair of flanges 68 on arm 60c of bracket 22b extend to be generally parallel with and adjacent the adjoining sides 230c, 230d of the horizontal tubular member 14b while the flanges 68 on arm 60d extend to be generally parallel with and adjacent the adjoining sides 130c, 130d of the vertical tubular member 14a. In this way, the brackets 22a, 22b create in effect a reinforcing connection between the tubular members 14a, 14b that supplements the primary connection formed by the interlocked relationship of the tubular members. The flanges may be in abutment with the adjoining sides but some clearance is generally preferred to facilitate assembly. Alternatively, the flanges can be eliminated if desired.

An exploded view of a complete tee joint 18 is shown in FIG. 3. The tee joint 18 is formed between an upright or vertically oriented tubular member 114a at a midpoint 32 therealong and an end 34c of a horizontally oriented tubular member 114b.

The vertical tubular member has material removed from the inner side 330a and two adjoining sides 330c, 330d to define a cutout generally designated by reference numeral 140. In a similar manner, but with a different configuration, material is removed from the inner side 430a and two adjoining sides 430c, 430d at the end 34c of the horizontal tubular member 114b to define a cutout generally designated by reference numeral 40c. The cutout 40c is akin to the cutouts 40a and 40b already described in connection with the elbow joint 16.

The cutout 140 in the vertical tubular member 114a includes a substantially rectangular central cutout 244a in the inner side 330a. First and second linear slots 346a, 446a are cut into adjoining side 330c and third and fourth linear slots 346b, 446b are cut into adjoining side 330d (see FIG. 3B). The linear slots 346a, 446a, 346b, 446b extend from the central cutout 244a transversely to a longitudinal length of the vertical tubular member 114a, with a depth of the slots 346a, 446a, 346b, 446b being approximately one-half the outside dimension of the adjoining sides 330c, 330d within which they are formed. As shown in FIG. 3F, the edges 80 adjoining the inner side 430a and the adjoining sides 430c, 430d of the horizontal tubular member 114b are radiused adjacent the central cutout 144c to allow clearance of the inside radius of the interlocking vertical tubular member and ensure that the outer surfaces of the vertical and horizontal members are flush with one another when the members are fully interlocked to create the joint.

The first and second linear slots 346a, 446a are parallel with one another and in horizontal alignment with the third and fourth linear slots 346b, 446b, respectively, which are similarly parallel with one another. The longitudinal spacing between the first and second linear slots 346a, 446a and between the third and fourth linear slots 346b, 446b is equal to the lateral spacing between the adjoining sides 430c, 430d of the horizontal tubular member 114b so that the adjoining sides 430c, 430d of the horizontal tubular member 114b may be received within the slots 346a, 446a, 346b, 446b formed in the vertical tubular member 114a. To this end, the width of the slots 346a, 446a, 346b, 446b is approximately equal to the thickness of the adjoining sides 430c, 430d of the horizontal tubular member 114b, again to allow the horizontal tubular member to be nested within the cutout 140 of the vertical tubular member 114a when the tee joint is formed and create a continuous flat surface between the inner side 330a of the vertical member 114a flush with the outer side 430b of the horizontal member 114b.

The cutout 40c at the end 34c of the horizontal tubular member 114b includes a substantially rectangular central cutout 144c in the inner side 430a and a linear slot 546a, 546b cut into each adjoining side 430c, 430d, respectively. The slots 546a, 546b extend laterally from the central cutout 144c with a depth of the linear slots 546a, 546b being approximately one-half the outside dimension of the adjoining sides 430c, 430d. The slots 546a, 546b in each adjoining side 430c, 430d are parallel and vertically aligned with one another, and are spaced from an outer end edge 50c of the horizontal tubular member 114b by a distance slightly greater than the spacing between the adjoining sides 330c, 330d of the vertical tubular member 114a.

As with cutouts 40a and 40b, the cutout 40c at the end 34c of the horizontal tubular member 114b includes stepped cuts 52e and 52f in the end edge 50c of each of the adjoining sides 430d, 430d, respectively. The stepped cuts 52e, 52f are parallel with, and have the same depth as, the slots 546a, 546b, respectively. The width of the stepped cuts 52e, 52f as measured in the longitudinal direction of the tubular member 114b, is about the same as the thickness of the adjoining edge 330d of the vertical tubular member 114a adjacent the cutout 140. Like the edges 80, the edges of the stepped cuts 52e, 52f are radiused adjacent the end cutout 40c as shown in FIG. 3F to allow clearance when the vertical and horizontal tubular members are interlocked.

To form a tee joint between the vertical tubular member 114a and the horizontal tubular member 114b, the cutouts 140 and 40c are brought into alignment and abutment with one another so that the slots 546a, 546b in the horizontal tubular member 114b are nested in the slots 346a, 446a formed in the adjoining side 330c of the vertical tubular member 114a. At the same time, the stepped cuts 52e, 52f in the end edge 50c of the horizontal tubular member 114b are brought into engagement with the slots 346b, 446b in the adjoining side 330d of the vertical tubular member 114a. The stepped cuts 52e, 52f provide room for the adjoining side 330d to fit over and close the open end 34c of the horizontal tubular member 114b, eliminating any need for a plug when said horizontal and vertical tubular members are interlocked. In addition, the engagement between the stepped cuts and the slots results in a continuous flat surface between the adjacent sides of the vertical and horizontal members when fully interlocked, with the inner side 330a of the vertical member 114a being flush with the outer side 430b of the horizontal member 114b as shown in FIG. 3G. Similarly, the outer side 330b of the vertical member 114a is flush with the inner side 430a of the horizontal member 114b when the members are interlocked.

Figure 3D:
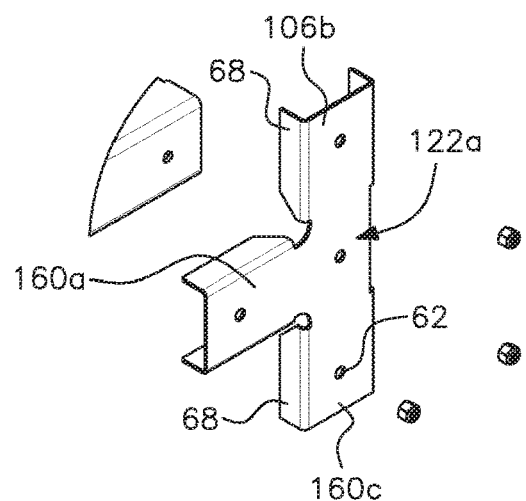
FIG. 3D is an enlarged view of Detail A of FIG. 3.
Figure 3E:
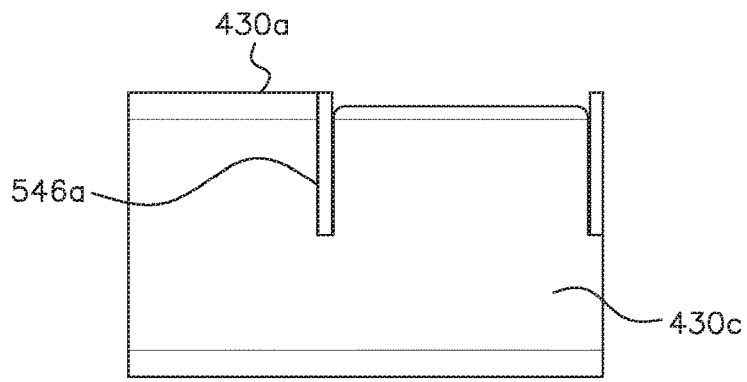
FIG. 3E is a top view of the horizontal tubular member shown in FIG. 3BB, showing the material to be removed to obtain the slot and end notch shown in FIG. 3BB.
Figure 3F:
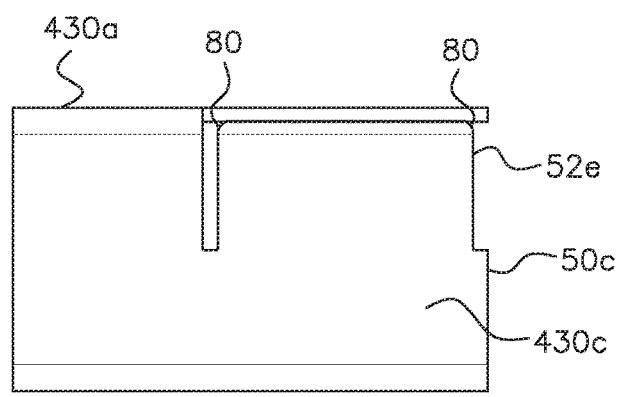
FIG. 3F is another top view of the horizontal tubular member shown in FIG. 3BB showing the material to be removed to obtain the central cutout shown in FIG. 3BB.
Figure 3G:
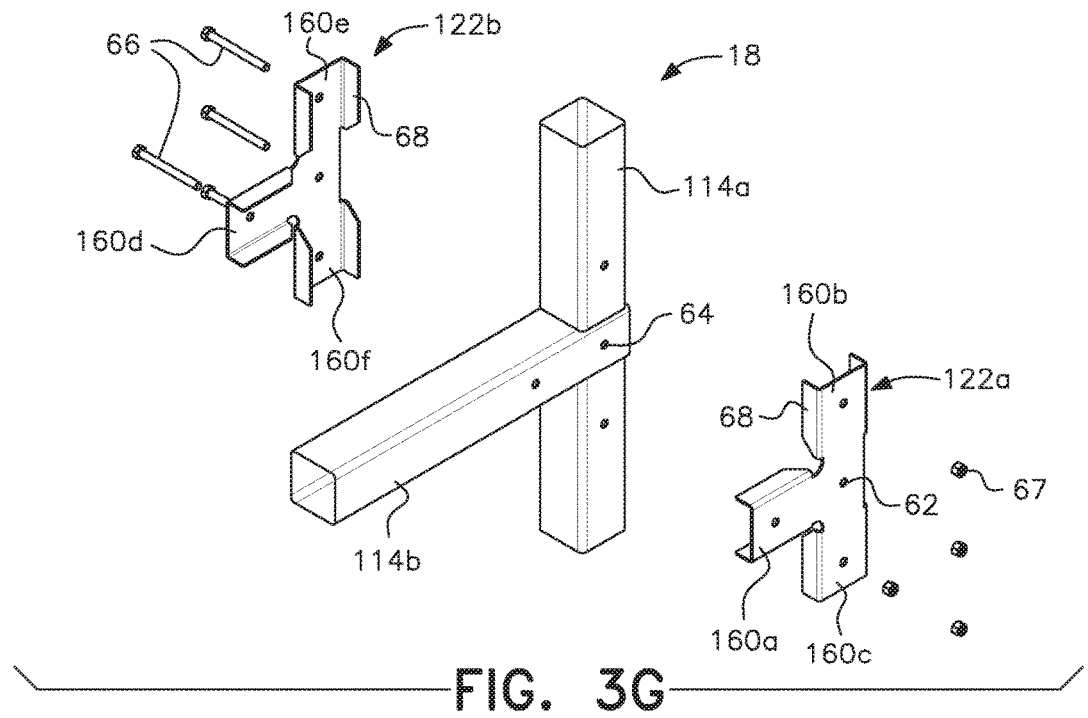
FIG. 3G is an exploded view of the brackets and a tee joint formed by interlocking the end portion of one tubular member and the mid-point of a second tubular member with the sides thereof flush with one another.
Figure 3A:
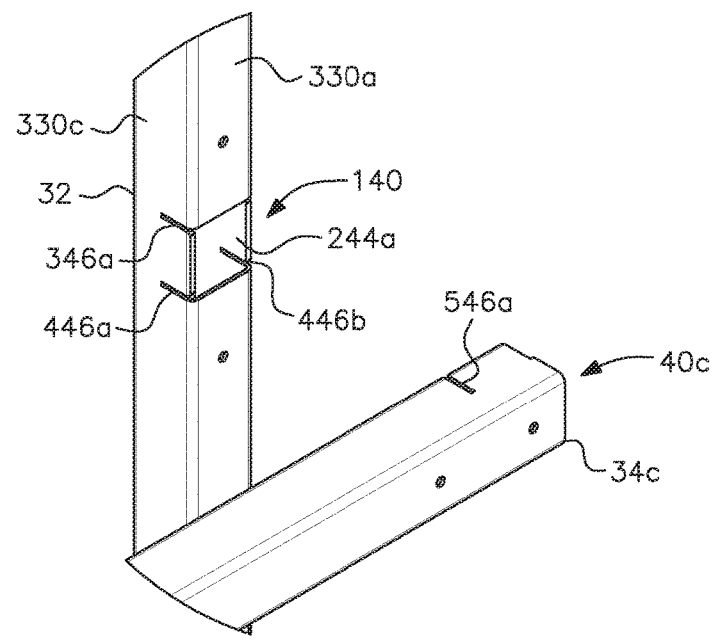
Figure 3B:
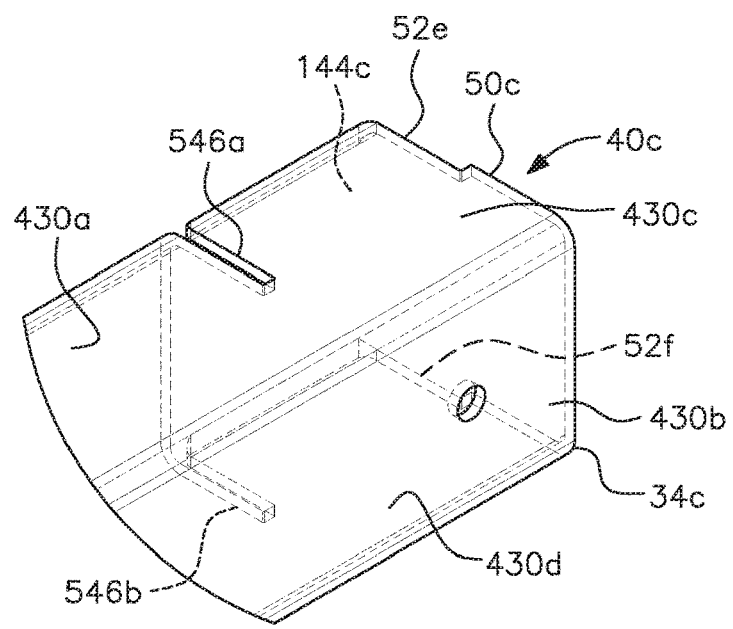

As with the elbow joint already described above, the tee joint is braced with matching stiffener brackets 122a, 122b to overcome the weakness caused by removal of material in order to make the cutouts and to reinforce the rigidity and structural strength of the joint (see FIGS. 3, 3D and 3G).

Bracket 122a includes a planar body having three arms 160a, 160b, 160c of substantially equal length, forming a T shape. Bracket 122b is the mirror image of bracket 122a and has the same construction with a planar body having three arms 160d, 160e, 160f. As with the arms of the brackets 22a, 22b, the arms of the tee joint bracket do not have to be of the same length but may be of different lengths. Preferably, arms 160a and 160d are the same length, arms 160b and 160e are the same length, and arms 160c and 160f are the same length. Regardless of whether the bracket arm pairs have the same or varying lengths, each corresponding pair of arms has apertures 62 in alignment with one another for securing of the brackets against the interlocked tubular members.

When the horizontal and vertical tubular members are interlocked, the first arm 160a of bracket 122a is in abutment with the outer side 430b of the horizontal tubular member 114b, and the second and third arms 160b, 160c are in abutment with the inner side 330a of the vertical tubular member 114a. Likewise, the first arm 160d of bracket 122b is in abutment with the inner side 430a of the horizontal tubular member 114b and the second and third arms 160e, 160f of bracket 122b are in abutment with the outer side 330b of the vertical tubular member 114a. The brackets 122a, 122b have apertures 62 therein that align with corresponding apertures 64 in the tubular members to allow fastening members such as bolts 66 to be inserted through the completed joint and tightened with nuts 67 to securely clamp the tubular members against one another.

As shown in FIGS. 3, 3D and 3G, the brackets 122a, 122b are preferably provided with flanges 68 that extend outwardly from and perpendicular to the arms in like manner to that of the brackets 22a, 22b of the elbow joint 16. When the vertical and horizontal tubular members 114a, 114b are interlocked, the pair of flanges 68 on the first arm 160a of bracket 122a extend to be generally parallel with and adjacent the adjoining sides 430c, 430d of the horizontal tubular member 114b while the flanges 68 on the second and third arms 160b, 160c extend to be generally parallel with and adjacent the adjoining sides 330c, 330d of the vertical tubular member 114a. The pair of flanges 68 on the first arm 160d of bracket 122b extend to be generally parallel with and adjacent the adjoining sides 430c, 430d of the horizontal tubular member 114b while the flanges 68 on the second and third arms 160e, 160f of bracket 122b extend to be generally parallel with and adjacent the adjoining sides 330c, 330d of the vertical tubular member 114a. Thus, as with the elbow joint, the brackets 122a, 122b form a reinforcing connection between the nested tubular members 114a, 114b that is further bolstered by the flanges 68. The flanges may be in abutment with the adjoining sides but some clearance is generally preferred to facilitate assembly. Alternatively, the flanges can be eliminated if desired.

The cross joint 20 is formed between two tubular members each having the same construction as that of tubular member 114a just described in connection with the tee joint. However, for purposes of clarity in description, the horizontal tubular member will be designated with reference numeral 114c, the cutout will be designated with reference numeral 240 and the slots therein will be designated with reference numerals 646a, 646b, 746a and 746b.

The cutout 240 formed in the horizontally oriented tubular member 114c is the same as the cutout 140 formed in the vertically oriented tubular member 114a, having a central cutout with first and second linear slots 646a, 746a cut into adjoining side 530c and third and fourth linear slots 646b, 746b cut into adjoining side 530d (see FIG. 4B). The linear slots 646a, 746a, 646b, 746b extend laterally from the central cutout (not shown) in the cutout 240 and have a depth, width and spacing like that already described in connection with the slots 346a, 446a, 346b, 446b in the vertical tubular member 114a of the tee joint. Hence, the adjoining sides 530c, 530d of the horizontal tubular member 114c are received within the slots 346a, 446a, 346b, 446b formed in the vertical tubular member 114a (see FIG. 4BB), and the adjoining sides 330c, 330d of the vertical tubular member 114a are received within the slots 646a, 746a, 646b, 746b formed in the horizontal tubular member 114a when the vertical and horizontal tubular members are interlocked to form the cross joint 20. Once the two members are interlocked, the inner side 330a of the vertical member 114a is flush with the outer side 530b of the horizontal member 114c (see FIG. 4C), and the outer side 330b of the vertical member 114a is flush with the inner side 530a of the horizontal member 114c.

Figure 4C:
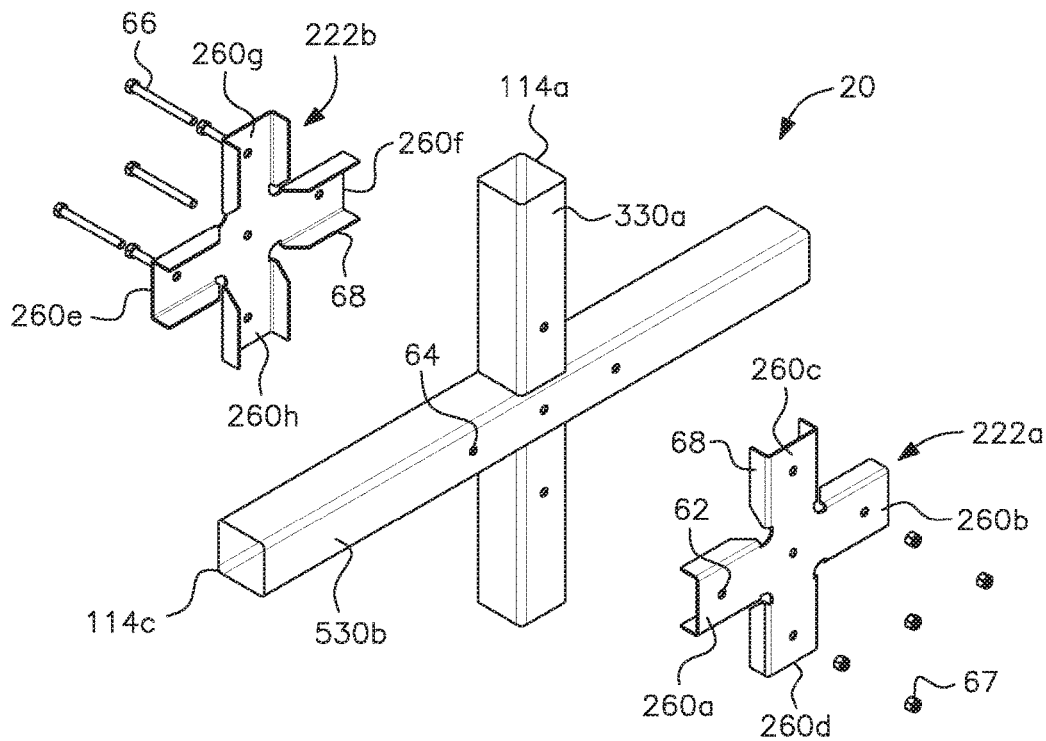
FIG. 4C is an exploded view of the brackets and a cross joint formed by interlocking the mid-portions of two tubular members with the sides thereof flush with one another.
Figure 4D:
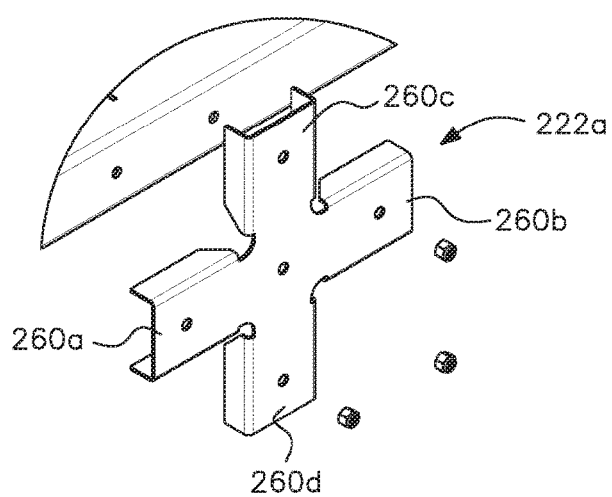
FIG. 4D is an enlarged view of Detail A of FIG. 4.
Figure 4E:
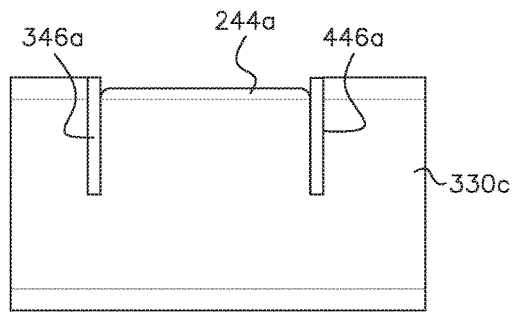
FIG. 4E is a side view of the vertical tubular member showing the material to be removed to obtain the two slots shown in FIG. 4BB.
Figure 4F:
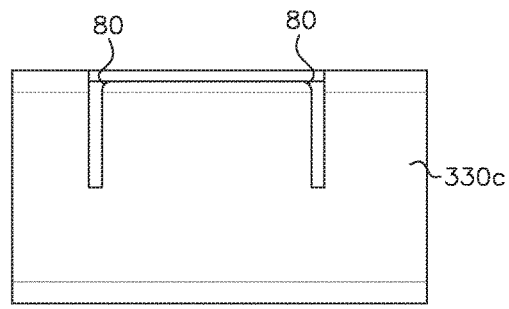
FIG. 4F is another side view of the vertical tubular member shown in FIG. 4BB showing the material to be removed to obtain the central cutout shown in FIG. 4BB.
Figure 4A:
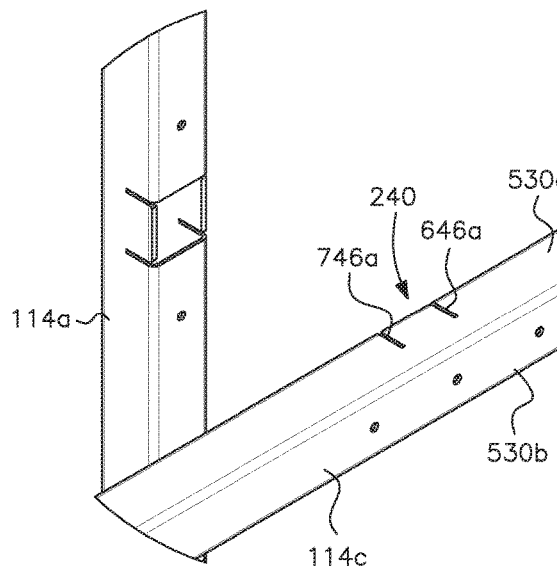
Figure 4B:
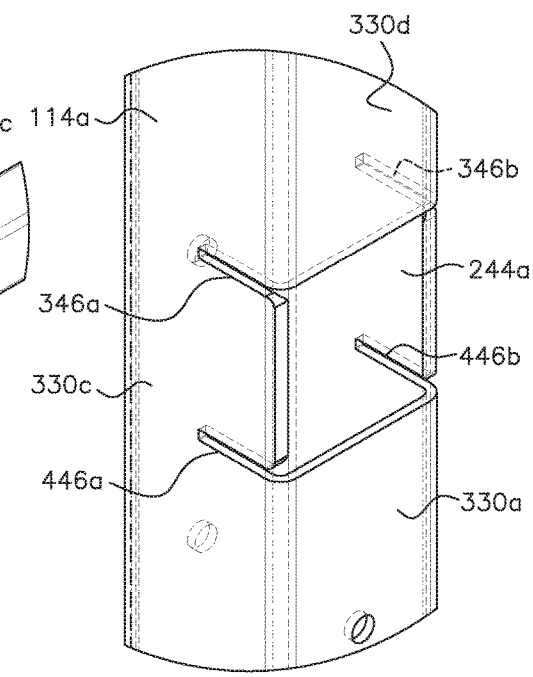

As with the elbow and tee joints already described above, the cross joint is braced with matching stiffener brackets 222a, 222b to overcome the weakness caused by removal of material in order to make the cutouts and to reinforce the rigidity and structural strength of the joint (see FIGS. 4, 4C and 4D).

Bracket 222a includes a planar body having four arms 260a, 260b, 260c, 260d of substantially equal length, forming a cross shape. Bracket 222b is the mirror image of bracket 222a and has the same construction with a planar body having four arms 260e, 260f, 260g, 260h. In like manner to the brackets already described, the arms do not have to be equal in length.

When the horizontal and vertical tubular members are interlocked, the first and second arms 260a, 260b of bracket 222a are in abutment with the outer side 530b of the horizontal tubular member 114c, and the third and fourth arms 260c, 260d are in abutment with the inner side 330a of the vertical tubular member 114a (see. FIG. 4C). Likewise, the first and second arms 260e, 260f of bracket 222b are in abutment with the inner side 530a of the horizontal tubular member 114c and the third and fourth arms 260g, 260h of bracket 222b are in abutment with the outer side 330b of the vertical tubular member 114a. The brackets 222a, 222b have apertures 62 therein that align with corresponding apertures 64 in the tubular members to allow fastening members such as bolts 66 to be inserted through the completed joint and tightened with nuts 67 to securely clamp the tubular members against one another.

As shown in FIGS. 4, 4C and 4D, the brackets 222a, 222b are preferably provided with flanges 68 that extend outwardly from and perpendicular to the arms in like manner to that of the brackets already described in connection with the elbow and tee joints. As is evident from the drawings and the teaching already presented herein, when the vertical and horizontal tubular members 114a, 114c are interlocked in the nested arrangement described herein, the pair of flanges 68 on the first and second arms 260a, 260b of bracket 222a and on the first and second arms 260e, 260f of bracket 222b are generally parallel to and adjacent the adjoining sides 530c, 530d of the horizontal tubular member 114c while the flanges 68 on the third and fourth arms 260c, 260d of bracket 222a and on the third and fourth arms 260g, 260h of bracket 222b are generally parallel to and adjacent the adjoining sides 330c, 330d of the vertical tubular member 114a. Thus, the brackets 222a, 222b reinforce and add rigidity to the joint between the tubular members 114a, 114c. The flanges may be in abutment with the adjoining sides but some clearance is generally preferred to facilitate assembly. Alternatively, the flanges can be eliminated if desired.

Figure 5:
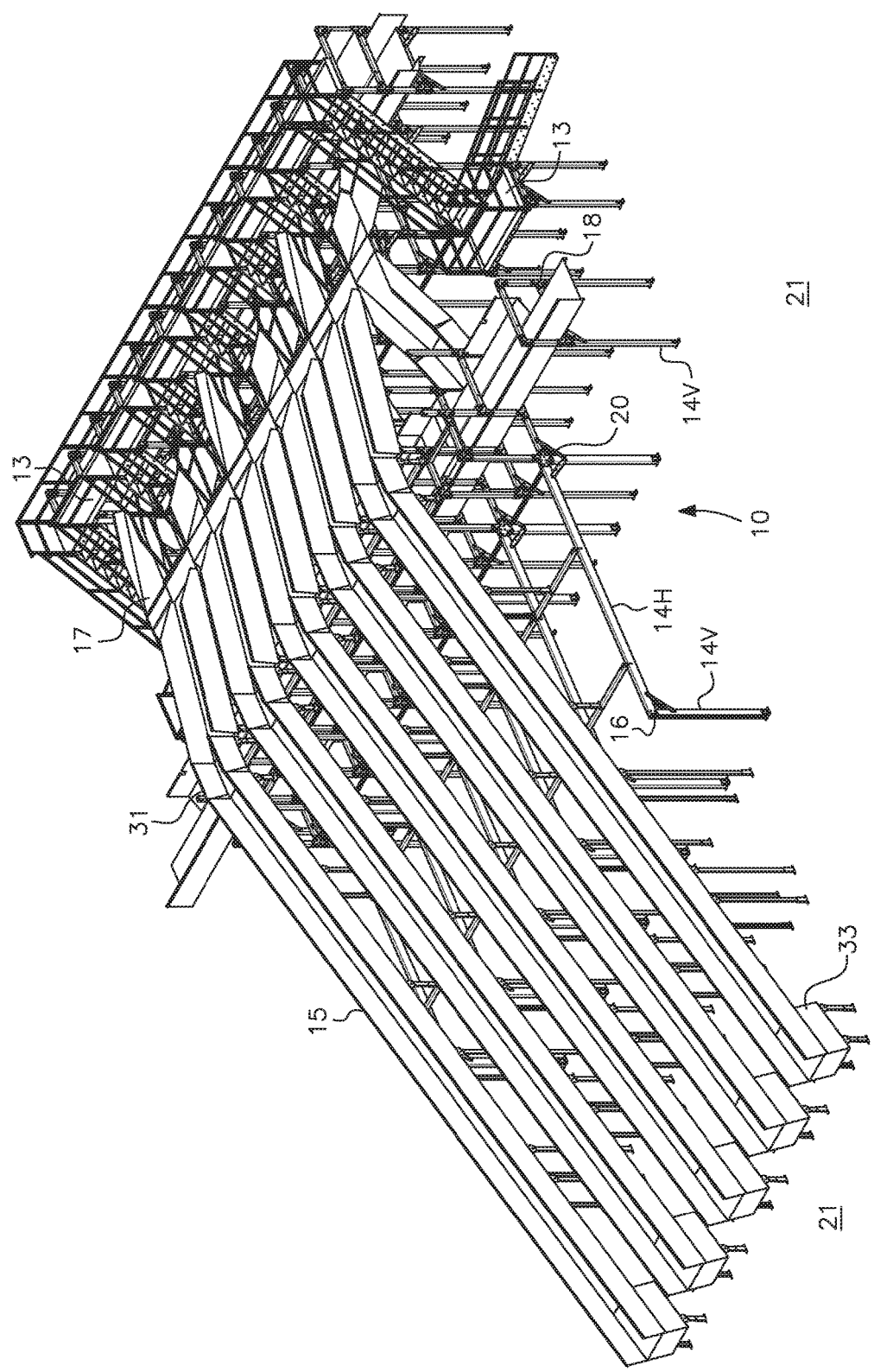
FIG. 5 is a perspective view of the conveyor and mezzanine support structure of FIG. 1 supporting conveyors and chutes as well as the mezzanine/platform.

A conveyor and mezzanine support structure 10 in accordance with the present invention, together with a mezzanine/platform 13 as well as conveyors 15 and chutes 17 supported thereon, is shown in FIG. 5. The vertically oriented tubular members 14V have their lower ends supported on a floor 21 or comparable support surface, whether on any of the intermediate floors in a multi-story building or the ground floor level. Horizontally oriented tubular members 14H are interlocked with the vertical tubular members at midway points along the latter to form cross joints 20 and tee joints 18 in the manner that has been described above. Upper ends of at least some of the vertical members are joined with horizontal members to form elbow joints 16, also in the manner described above.

The mezzanine/platform 13 is supported on the support structure 10 at a height above the floor 21 and typically at one end of the support structure as shown. A plurality of conveyors 15 and chutes 17 are also supported on the support structure; more or fewer conveyors may be used, including a single conveyor, as would be understood by persons of skill in the art. The conveyors are inclined to extend from their upper ends 31 on or adjacent the mezzanine/platform 13 to their lower ends 33 on or adjacent the floor and at an opposite end of the support structure. The mezzanine/platform 13 and associated conveyors 15 and chutes 17, as supported on the support structure 10, provide a sturdy industrial assembly that may be used effectively to move products and/or equipment between floors in a building, such as between the mezzanine/platform to the floor of a warehouse. At the same time, the bolted together construction of the interlocking, bracket-stiffened elbow joints 16, tee joints 18 and cross joints 20 in the support structure 10 allow the subassemblies 12 to be readily disassembled, facilitating the process by which the entire assembly can be dismantled and relocated when necessary.

The support structure according to the present invention is preferably made of steel. However, given the non-welded construction described herein, the support structure may be made of other materials including plastic. Aluminum could also be used more easily than with the existing TIG welding requirements associated with the conventional type of construction. In the case of a steel construction, the cutouts in the tubular members may be made using a tube laser and the like, and the stiffener brackets may be made using a sheet laser and brake press, and the like.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A support structure for conveyors and mezzanines comprising:
    a plurality of elongated interlocking tubular members, each tubular member having four sides and a substantially rectangular lateral cross section, said four sides including an inner side and an outer side joined by two adjoining sides, the inner side and two adjoining sides of a first tubular member defining a cutout configured to interlock with a complementary cutout defined by the inner and adjoining sides of a second tubular member to which the first tubular member is interlocked in a perpendicular relationship;
    a pair of stiffener brackets, each bracket having a planar body with apertures therein, a first bracket positioned on the outer side of the first tubular member and a second bracket positioned on the outer side of the second tubular member when the tubular members are interlocked with said apertures in alignment;
    fastening members inserted through said apertures and secured so as to clamp the two brackets and the first and second tubular members together; and
    at least one support surface formed by said plurality of tubular members when said tubular members are interlocked and clamped with said stiffener brackets and fastening members; and
    a supported structure selected from the group consisting of 1) a conveyor, 2) a mezzanine, and 3) both a conveyor and a mezzanine in combination, said supported structure being supported on said support surface in an operable configuration.

2. The support structure as set forth in claim 1, wherein said supported structure is a conveyor and said at least one support surface is a conveyor support surface for supporting said conveyor without a mezzanine.

3. The support structure as set forth in claim 1, wherein said supported structure is a mezzanine and said at least one support surface is a mezzanine support surface for supporting said mezzanine without a conveyor.

4. The support structure as set forth in claim 1, wherein said supported structure includes the combination of a conveyor and a mezzanine, and said at least one support surface includes a plurality of support surfaces that include a conveyor support surface for supporting the conveyor and a mezzanine support surface for supporting the mezzanine.

5. The support structure as set forth in claim 1, wherein said cutout in said first tubular member includes a substantially rectangular central cutout in said inner side and at least one linear slot cut into each adjoining side that extends from said central cutout transversely to a longitudinal length of said first tubular member, a depth of said linear slot being approximately one-half an outside dimension of an adjoining side of said first tubular member, the at least one linear slot in each adjoining side being aligned with one another;
    said complementary cutout in said second tubular member also including a substantially rectangular central cutout in the inner side of said second tubular member and at least one linear slot cut into each adjoining side of said second tubular member that extends from said central cutout transversely to a longitudinal length of said second tubular member, a depth of said linear slot being approximately one-half an outside dimension of an adjoining side of said second tubular member, the at least one linear slot in each adjoining side of said second tubular member being aligned with one another; and
    said first and second tubular members being interlocked when said rectangular central cutouts are aligned with each other and the adjoining sides of the first and second tubular members are nested together along the slots to bring the outer side of the first tubular member into a flush relationship with the inner side of the second tubular member.

6. The support structure as set forth in claim 1, wherein the planar body of the first bracket has a first arm in abutment with the outer side of the first tubular member and a second arm in abutment with the inner side of the second tubular member and the planar body of the second bracket has a first arm in abutment with the inner side of the first tubular member and a second arm in abutment with an outer side of the second tubular member when the first and second tubular members are interlocked.

7. The support structure as set forth in claim 6, wherein the bracket arms have flanges extending perpendicular to the planar body, the flanges on the first arm being generally parallel with and adjacent the adjoining sides of the first tubular member and the flanges on the second arm being generally parallel with and adjacent the adjoining sides of the second tubular member.

8. The support structure as set forth in claim 5, wherein said first and second tubular members are interlocked at end portions thereof to form an elbow joint, the cutout in each of said end portions further including a stepped cut in an end edge, a depth of said stepped cut being approximately half the outside dimension of the adjoining sides of said tubular members, an open end of said end portion of said first tubular member being closed by one of the adjoining sides of said second tubular member and an open end of said end portion of said second tubular member being closed by one of the adjoining sides of the first tubular member through engagement of said first and second tubular members along the stepped cuts when said first and second tubular members are interlocked, eliminating any need for a plug to close the open ends.

9. The support structure as set forth in claim 5, wherein the cutout further includes a second linear slot cut into at least one of the first and second tubular members.

10. The support structure as set forth in claim 9, wherein said first and second tubular members are interlocked at an end portion of said first tubular member and a midway point of said second tubular member to form a tee joint, the cutout in said first tubular member further including a stepped cut in an end edge, a depth of said stepped cut being approximately half the outside dimension of the adjoining sides of said tubular members, said second tubular member having said second linear slot, an open end of said first tubular member being closed by one of the adjoining sides of said second tubular member through engagement of said stepped cut and said second linear slot when said first and second tubular members are interlocked, eliminating any need for a plug.

11. The support structure as set forth in claim 10, wherein the planar body of the first bracket has a first arm in abutment with the outer side of the first tubular member and second and third arms in abutment with the inner side of the second tubular member and the planar body of the second bracket has a first arm in abutment with the inner side of the first tubular member and second and third arms in abutment with an outer side of the second tubular member when the first and second tubular members are interlocked in the tee joint.

12. The support structure as set forth in claim 9, wherein the cutout in each of said first and second tubular members has a second linear slot, said first and second tubular members being interlocked at a point midway along each of said first and second tubular members to form a cross joint.

13. The support structure as set forth in claim 12, wherein the planar body of the first bracket has first and second arms in abutment with the outer side of the first tubular member and third and fourth arms in abutment with the inner side of the second tubular member and the planar body of the second bracket has first and second arms in abutment with the inner side of the first tubular member and third and fourth arms in abutment with an outer side of the second tubular member when the first and second tubular members are interlocked in the cross joint.

14. An assembly including at least one of a conveyor and a mezzanine comprising:
a support structure including,
a plurality of elongated interlocking tubular members, each tubular member having four sides and a substantially rectangular lateral cross section, said four sides including an inner side and an outer side joined by two adjoining sides, the inner side and two adjoining sides of a first tubular member defining a cutout configured to interlock with a complementary cutout defined by the inner and adjoining sides of a second tubular member to which the first tubular member is interlocked in a nested perpendicular relationship to form a joint, one of said tubular members being oriented vertically and having a lower end supported on a floor or comparable support surface;
a pair of stiffener brackets placed on opposite sides of the joint, each bracket having a planar body with apertures therein, a first bracket positioned on the outer side of the first tubular member and a second bracket positioned on the outer side of the second tubular member when the tubular members are interlocked with said apertures in alignment; and
fastening members inserted through said apertures and secured so as to clamp the two brackets and the first and second tubular members together to complete the joint; and
at least one supported structure selected from the group consisting of 1) a mezzanine supported on said support structure at a height above the floor and 2) a conveyor supported on said support structure and being inclined to extend from a lower end adjacent the floor to an upper end that is higher than said lower end.

15. The assembly as set forth in claim 14, wherein said at least one supported structure includes a plurality of supported structures including both a mezzanine and a conveyor, said upper end of the conveyor being adjacent said mezzanine.

16. The assembly as set forth in claim 14, wherein said cutout in said first tubular member includes a central cutout in said inner side and at least one linear slot cut into each adjoining side that extends from said central cutout transversely to a longitudinal length of said first tubular member, a depth of said linear slot being approximately one-half an outside dimension of an adjoining side of said first tubular member, the at least one linear slot in each adjoining side being aligned with one another;
said complementary cutout in said second tubular member also including a central cutout in the inner side of said second tubular member and at least one linear slot cut into each adjoining side of said second tubular member that extends from said central cutout transversely to a longitudinal length of said second tubular member, a depth of said linear slot being approximately one-half an outside dimension of an adjoining side of said second tubular member, the at least one linear slot in each adjoining side of said second tubular member being aligned with one another; and
said first and second tubular members being interlocked when said central cutouts are aligned with each other and the adjoining sides of the first and second tubular members are nested together along the slots to bring the outer side of the first tubular member into a flush relationship with the inner side of the second tubular member.

17. A mezzanine conveyor assembly comprising:
a mezzanine platform;
a conveyor; and
a support structure including a plurality of elongated interlocking tubular members, each tubular member having four sides and a substantially rectangular lateral cross section, said four sides including an inner side and an outer side joined by two adjoining sides, the inner side and two adjoining sides of a first tubular member defining a cutout configured to interlock with a complementary cutout defined by the inner and adjoining sides of a second tubular member to which the first tubular member is interlocked in a perpendicular relationship, a pair of stiffener brackets including a first bracket positioned on the outer side of the first tubular member and a second bracket positioned on the outer side of the second tubular member when the tubular members are interlocked, and fastening members secured so as to clamp the two brackets and the first and second tubular members together; and
at least one of said mezzanine platform and said conveyor being supported on said support structure in an operable configuration.

18. The mezzanine conveyor assembly as set forth in claim 17, wherein the cutouts are substantially square and said first and second tubular members have a square lateral cross section.

19. The mezzanine conveyor assembly as set forth in claim 17, wherein said assembly includes at least a first pair of first and second tubular members interlocked at end portions thereof to form an elbow joint, at least a second pair of first and second tubular members interlocked at an end portion of a first tubular member of said second pair of tubular members and a midway point of a second tubular member of said second pair of tubular members to form a tee joint, and at least a third pair of first and second tubular members interlocked at a point midway along each of said third pair tubular members to form a cross joint.

20. A joint between two elongated tubular members of a mezzanine conveyor support structure in combination with a conveyor, a mezzanine, or a conveyor and mezzanine assembly comprising:
- a first tubular member and a second tubular member oriented perpendicular to one another to form the joint, each tubular member having four sides and a substantially rectangular lateral cross section, said four sides including an inner side and an outer side joined by two adjoining sides, the inner side and two adjoining sides of the first tubular member defining a cutout configured to interlock with a complementary cutout defined by the inner and adjoining sides of the second tubular member;
- said cutout in said first tubular member including a substantially rectangular central cutout in said inner side and at least one linear slot cut into each adjoining side that extends from said central cutout transversely to a longitudinal length of said first tubular member, a depth of said linear slot being approximately one-half an outside dimension of adjoining side of said first tubular member, the at least one linear slot in each adjoining side being aligned with one another;
- said complementary cutout in said second tubular member also including a substantially rectangular central cutout in the inner side of said second tubular member and at least one linear slot cut into each adjoining side of said second tubular member that extends from said central cutout transversely to a longitudinal length of said second tubular member, a depth of said linear slot being approximately one-half an outside dimension of an adjoining side of said second tubular member, the at least one linear slot in each adjoining side of said second tubular member being aligned with one another;
- said first and second tubular members being interlocked in said perpendicular relationship when said rectangular central cutouts are aligned with each other and the adjoining sides of the first and second tubular members are nested together along the slots to bring the outer side of the first tubular member into a flush relationship with the inner side of the second tubular member;
- a pair of stiffener brackets, each bracket having a planar body with apertures therein, a first bracket positioned on the outer side of the first tubular member and a second bracket positioned on the outer side of the second tubular member when the tubular members are interlocked with said apertures in alignment;
- fastening members inserted through said apertures and secured so as to clamp the two brackets and the first and second tubular members together to complete the joint; and
- said joint being part of said mezzanine conveyor support structure that includes a support surface that supports at least one of said conveyor and said mezzanine in an operable configuration.

21. The combination as set forth in claim 20, wherein the planar body of the first bracket has a first arm in abutment with the outer side of the first tubular member and a second arm in abutment with the inner side of the second tubular member and the planar body of the second bracket has a first arm in abutment with the inner side of the first tubular member and a second arm in abutment with an outer side of the second tubular member when the first and second tubular members are interlocked.

22. The combination as set forth in claim 21, wherein the bracket arms have flanges extending perpendicular to the planar body, the flanges on the first arm being generally parallel with and adjacent the adjoining sides of the first tubular member and the flanges on the second arm being generally parallel with and adjacent the adjoining sides of the second tubular member.

23. The combination as set forth in claim 21, wherein said tubular members have a substantially square lateral cross section.

24. The combination as set forth in claim 23, wherein said first and second tubular members are interlocked at end portions thereof to form an elbow joint, the cutout in each of said end portions further including a stepped cut in an end edge, a depth of said stepped cut being approximately half the outside dimension of said tubular members, an open end of said end portion of said first tubular member being closed by one of the adjoining sides of said second tubular member and an open end of said end portion of said second tubular member being closed by one of the adjoining sides of the first tubular member through engagement of said first and second tubular members along the stepped cuts when said first and second tubular members are interlocked, eliminating any need for a plug to close the open ends.

* * * * *